United States Patent
Zhang

(10) Patent No.: US 12,554,268 B2
(45) Date of Patent: Feb. 17, 2026

(54) ROBOT CONTROL METHOD AND APPARATUS, ROBOT, COMPUTER-READABLE STORAGE MEDIUM, AND COMPUTER PROGRAM PRODUCT

(71) Applicant: TENCENT TECHNOLOGY (SHENZHEN) COMPANY LIMITED, Guangdong (CN)

(72) Inventor: Jingfan Zhang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 64 days.

(21) Appl. No.: 18/431,375

(22) Filed: Feb. 2, 2024

(65) Prior Publication Data

US 2024/0176365 A1    May 30, 2024

Related U.S. Application Data

(63) Continuation of application No. PCT/CN2023/115534, filed on Aug. 29, 2023.

(30) Foreign Application Priority Data

Sep. 30, 2022    (CN) .......................... 202211220298.8

(51) Int. Cl.
  *G05D 1/65*    (2024.01)
  *B62D 61/00*   (2006.01)
  *G05D 109/10*  (2024.01)

(52) U.S. Cl.
  CPC .............. *G05D 1/65* (2024.01); *B62D 61/00* (2013.01); *G05D 2109/13* (2024.01)

(58) Field of Classification Search
  CPC ...... G05D 1/65; G05D 17/02; G05D 2109/13; B62D 61/00
  (Continued)

(56) References Cited

U.S. PATENT DOCUMENTS

2020/0306998 A1* 10/2020 Talebi .................... B25J 9/1638

FOREIGN PATENT DOCUMENTS

| CN | 106428284 A | 2/2017 |
| CN | 109760761 A | 5/2019 |

(Continued)

OTHER PUBLICATIONS

Wang, Shuai, Balance Control of a Novel Wheel-legged Robot: Design and Experiments, 2021, IEEE, pp. 1-6 (Year: 2021).*

(Continued)

*Primary Examiner* — Kurt Philip Liethen
*Assistant Examiner* — Anthony Donald Taylor, Jr.
(74) *Attorney, Agent, or Firm* — Sughrue Mion, PLLC

(57) ABSTRACT

A control method, executed by a control device, controlling a robot comprising a wheel leg portion and a base portion, the wheel leg portion and the base portion comprising a plurality of joints, the method including obtaining motion information of the robot and motion information of a sphere placed on the base portion of the robot, determining, based on the motion information of the robot and the motion information of the sphere when passivity based control is performed on the sphere and the base portion, base control information for controlling the base portion and balancing the sphere on the base portion, determining, based on the base control information, a control torque for controlling each joint of the plurality of joints, and controlling each joint based on the corresponding control torque.

20 Claims, 15 Drawing Sheets

(58) Field of Classification Search
USPC .......................................................... 701/70
See application file for complete search history.

(56) References Cited

FOREIGN PATENT DOCUMENTS

| | | | | |
|---|---|---|---|---|
| CN | 112975978 A | * | 6/2021 | ............ B25J 13/085 |
| CN | 113753150 A | | 12/2021 | |
| JP | 2006-55972 A | | 3/2006 | |

OTHER PUBLICATIONS

International Search Report dated Oct. 24, 2023 in Application No. PCT/CN2023/115534.
Communication dated Mar. 20, 2025 in Chinese Application No. 202211220298.8.

* cited by examiner (a) IDA-PBC (b) PD control (a)

(b)

(a)

(b)

ROBOT CONTROL METHOD AND APPARATUS, ROBOT, COMPUTER-READABLE STORAGE MEDIUM, AND COMPUTER PROGRAM PRODUCT

CROSS REFERENCE TO RELATED APPLICATIONS

This application is a continuation application of International Application No. PCT/CN2023/115534 filed on Aug. 29, 2023, which claims priority to Chinese Patent Application No. 202211220298.8 filed with the China National Intellectual Property Administration on Sep. 30, 2022, the disclosures of each being incorporated by reference herein in their entireties.

FIELD

The disclosure relates to the field of artificial Intelligence and robots, and in particular, to a robot control method and apparatus, a robot, a computer-readable storage medium, and a computer program product.

BACKGROUND

With the widespread application of artificial intelligence and robotics technologies in civilian and commercial fields, robots based on artificial intelligence and robotics technologies play an increasingly important role in intelligent transportation, smart homes, and other fields, and are also facing higher requirements. In simulations of practical applications such as transporting loads, a mobile robot is usually designed to select an object (a square object such as a carton) with a stable contact surface for transport. However, spherical objects are prone to rolling and sliding and the mobile robot further needs to balance the spherical object during transportation, which is a big challenge for robot control.

In the related art, the foregoing sphere balance scenario, as one of non-prehensile operations, has been tried on mobile robots with a robotic arm structure (such as balancing a basketball on an end plane of the robotic arm). However, on robots with a fixed base, the robotic arm does not require additional stability control, and thus for the robotic arm, sphere balance is much less difficult than sphere balance on an unstable wheel-legged robot. Therefore, the method for controlling sphere balance on a robotic arm cannot be applied to wheel-legged robots. For a wheel-legged robot, it is necessary to implement a non-prehensile rolling task for a load, that is, to balance various types of spheres on top of a floating base of the wheel-legged robot in a non-prehensile scenario. The robot also needs to move on different terrains and maintain balance on different and uneven terrains at the same time, which can be challenging for the entire control system. In addition, shaking of the floating base of the wheel-legged robot during sphere balance is also a major interference with balance control for the robot. Due to coupling of under-actuated characteristics in the two subsystems of sphere balance and robot balance, the control difficulty increases. Therefore, a robot control method is needed, so that a wheel-legged robot can efficiently and accurately perform a sphere balance task.

SUMMARY

Some embodiments provide a robot control method and apparatus, a robot, a computer-readable storage medium, and a computer program product. Balance control for a base portion of a wheel-legged robot and a sphere on the wheel-legged robot is added to a whole-body control framework of the wheel-legged robot, so that the sphere maintains balance during movement of the wheel-legged robot, thereby implementing the sphere balance task of the wheel-legged robot.

Some embodiments provide a control method, executed by a control device, for controlling a robot comprising a wheel leg portion and a base portion, the wheel leg portion and the base portion comprising a plurality of joints, the control method including: obtaining motion information of the robot and motion information of a sphere placed on the base portion of the robot; determining, based on the motion information of the robot and the motion information of the sphere when passivity based control is performed on the sphere and the base portion, base control information for controlling the base portion and balancing the sphere on the base portion; determining, based on the base control information, a control torque for controlling each joint of the plurality of joints; and controlling each joint based on the corresponding control torque.

Some embodiments provide a robot, including: a wheel leg portion; a base portion, connected to the wheel leg portion, where the wheel leg portion and the base portion include a plurality of joints; and a controller, disposed on the robot, wherein the controller is configured to: obtain motion information of the robot and motion information of a sphere placed on the base portion of the robot; determine, based on the motion information of the robot and the motion information of the sphere when passivity based control is performed on the sphere and the base portion, base control information for controlling the base portion and balancing the sphere on the base portion; determine, based on the base control information, a control torque for controlling each joint of the plurality of joints; and control each joint based on the corresponding control torque.

Some embodiments provide a non-volatile computer-readable storage medium, storing computer code which, when executed by at least one processor, causes the at least one processor to at least: obtain motion information of the robot and motion information of a sphere placed on the base portion of the robot; determine, based on the motion information of the robot and the motion information of the sphere when passivity based control is performed on the sphere and the base portion, base control information for controlling the base portion and balancing the sphere on the base portion; determine, based on the base control information, a control torque for controlling each joint of the plurality of joints; and control each joint based on the corresponding control torque.

According to the robot control method provided in some embodiments, passivity based control for a nonlinear system formed by both a base portion of a robot and a sphere on the base portion is added to whole-body control for the robot, where the nonlinear system is formed by both the base portion of the robot and the sphere on the base portion. Based on this, base control information for maintaining balance of the sphere is determined, and a control torque for each joint of the robot is determined based on the base control information. In this way, the wheel-legged robot can maintain balance of the sphere during movement, thereby implementing the sphere balance task of the wheel-legged robot. According to the robot control method provided in some embodiments, the wheel-legged robot can balance different rigid spheres on roads of various terrains, and can ensure stability of the sphere balance system after replacing a different sphere only by updating corresponding parameters of the sphere to the controller, without re-adjusting the controller.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1A:
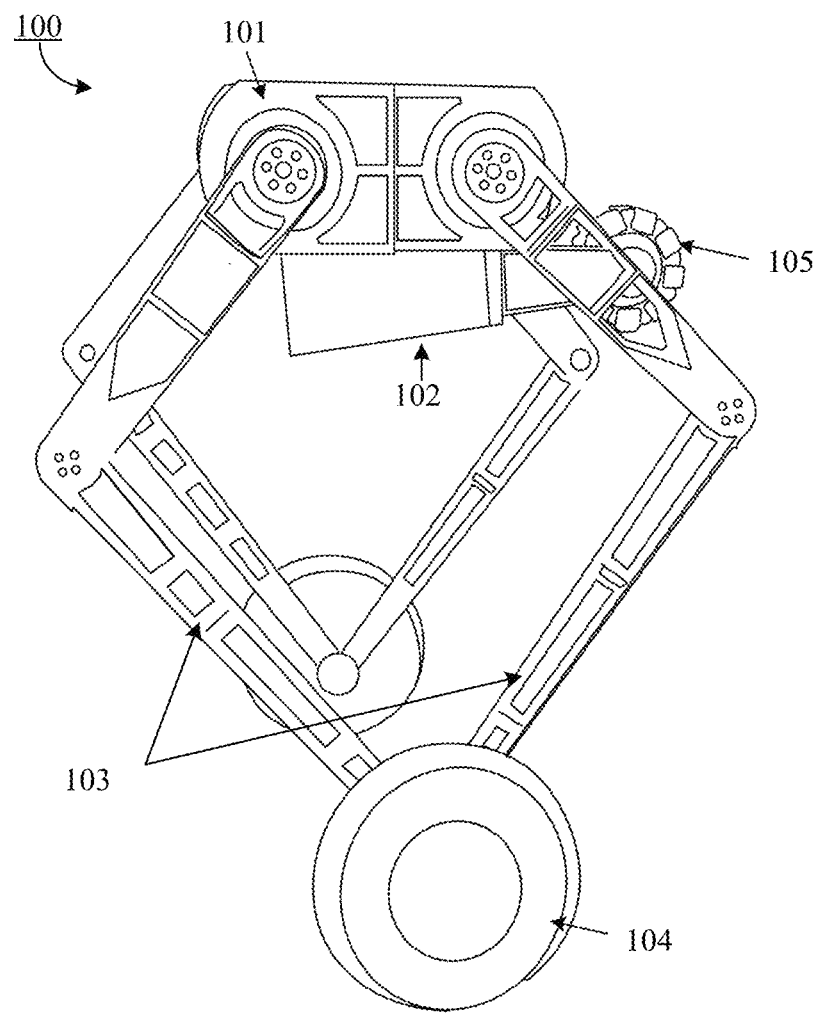
FIG. 1A is a schematic structural diagram of a robot with a left wheel leg portion and a right wheel leg portion in a single wheel leg configuration according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In this specification and the accompanying drawings, steps/operations, and elements that are substantially the same or similar are denoted by the same or similar reference numerals, and repeated descriptions of these steps/operations and elements are omitted. In addition, in the description of some embodiments, terms such as "first" and "second" are merely used for distinguishing between descriptions, and cannot be understood as an indication or implication of relative importance or a sequence.

Unless otherwise defined, meanings of all technical and scientific terms used in this specification are the same as those usually understood by a person skilled in the art to which the embodiments belong. Terms used in this specification are merely intended to describe objectives of the embodiments of the present disclosure, but are not intended to limit the present disclosure.

For ease of describing various embodiments, technical terms related in some embodiments are described below.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The technical solutions provided in some embodiments relate to robotics technologies in AI technologies. A robot is a mechanical and electronic device that can imitate certain human skills, which is a combination of mechanical transmission and modern microelectronics technologies. Robots are developed on the basis of electronic, mechanical, and information technologies. A robot does not necessarily have to look like a human being. As long as the robot can independently complete tasks and orders given by humans, it is a member of the robot family. A robot is an automated machine that has some intelligent capabilities similar to those of humans or living things, such as a perception capability, a planning capability, an action capability, and a collaboration capability. It is an automated machine with high flexibility. With the development of computer technologies and artificial intelligence technologies, functions and technical levels of robots have been greatly improved. Mobile robots and robot vision and touch technologies are typical representatives.

The robot control method of some embodiments may be based on passivity based control for nonlinear systems. The core idea of passivity based control for nonlinear systems is to construct a suitable mapping relationship between input and output, so that a close-loop system satisfies passivity conditions, and a controller is designed based on a passive theory, to finally achieve the purpose of system stabilization. A design process of passivity based control can be divided into two important stages. The first stage requires energy shaping of an open-loop system. In this stage, it is necessary to configure a desired balance point and adjust an energy function of the open-loop system, so that an energy function of a new close-loop system takes the minimum value at the balance point. The second stage is referred to as damping injection. In this process, a dissipation function of the system needs to be changed to inject additional damping into the system, to ensure asymptotic stability of the balance point of the close-loop system. The passivity based control method has been successfully applied in many physical systems, including mechanical systems, electrical systems, chemical processes, and electromechanical systems.

For example, in some embodiments, an interconnection and damping assignment-passivity based control (IDA-PBC) method can be used to achieve the balance of a sphere and a robot system. IDA-PBC is a controller design method for a nonlinear system. The core idea of IDA-PBC is to use state feedback to modify interconnection and damping matrices of the system, thereby configuring a positive definite energy function for the system, so that the energy function can serve as a Lyapunov function of the close-loop system. The main advantages of IDA-PBC are: first, the close-loop structure of the system is still a port-Hamiltonian (PH) system, so that there is a reasonable physical explanation for the control purpose; second, a desired interconnection and damping matrix can be configured for the system, which actually guarantees that the energy function of the system can be used as a close-loop storage function of the system; finally, as long as a control law can be solved, the energy function of the system can naturally be used as the Lyapunov function, that is, a mapping relationship is found. This allows the original system to be mapped to a target system, and the system energy function takes the minimum value at an ideal balance point, ultimately allowing the nonlinear system to reach balance in a target state.

In addition, the robot control method of some embodiments may be based on a robot perception and cognitive technology. The perception and cognitive technology is the basis for robots to operate safely, efficiently, and autonomously. In recent years, the field of computer vision has developed rapidly and has achieved many results that are comparable to or even surpass those of humans. At the same time, the development of tactile sensing technology is relatively slow, which to a certain extent restricts the expansion of robot capabilities. How to provide robots with tactile capabilities close to human levels in scenarios such as human-machine interaction, motion control, and dexterous operation has become one of the research hotspots and technical challenges in recent years. Various pressure sensors on robots have been extensively researched to mimic the touch of human skin. Depending on a work area, touch sensors have been used on fingers of robots to grab and manipulate objects like humans, on large areas of a human body for safe human-machine interaction, and on feet of robots to detect high dynamic range pressure to balance and control robot motion. However, touch sensors are not commonly used on mobile robots. The application of touch sensors to non-prehensile rolling operations is an interesting topic and may inspire further applications of large-area electronic skins on mobile robots for human-machine interaction. Therefore, in some embodiments, a touch sensor can be combined with a wheel-legged robot by using a new piezoresistive material with ultra-high sensitivity, ultra-large range, ultra-fast response speed, and ultra-strong cycle stability, combined with a customized electrode adaptation module and a high-speed signal acquisition module, allowing the robot to sense extremely subtle pressure changes on the body surface. By adding the touch sensor to the surface of the robot, the robot can use its own "skin" to sense external contact information, including the perception and recognition of touch manners, touch strength, touch direction, and touch trajectory shapes, and respond in different ways.

In some embodiments, the robot may be an under-actuated robot. The under-actuated robot means that a number of degrees of freedom (DOF) of the robot exceeds the minimum number of degrees of freedom required by the robot to complete a task. In this case, the robot cannot achieve the required task through simple motion, but needs to rely on other strategies, such as planning, control, and perception. For example, the under-actuated robot may be a wheel-legged robot as shown in FIG. 1A.

Figure 1B:
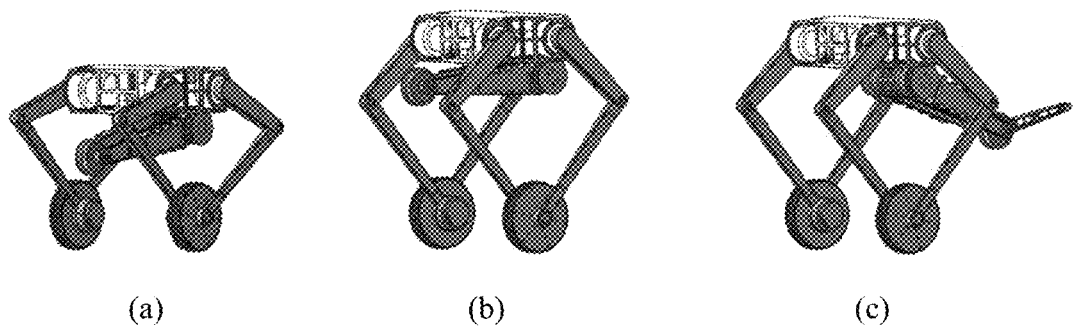
FIG. 1B is a schematic diagram of a structure change of a robot with a left wheel leg portion and a right wheel leg portion in a single wheel leg configuration according to some embodiments.

FIG. 1A is a schematic structural diagram of a robot with a left wheel leg portion and a right wheel leg portion in a single wheel leg configuration according to some embodiments. FIG. 1B is a schematic diagram of a structure change of a robot with a left wheel leg portion and a right wheel leg portion in a single wheel leg configuration according to some embodiments.

FIG. 1A is a schematic exemplary diagram of a structure of a robot 100. The wheel-legged robot 100 may include: a base portion 101, a wheel leg portion 103, and driving wheels 104 (or referred to as a foot portion) in the wheel leg portion 103. The base portion 101 refers to the main body of the robot, for example, may be the trunk part of the robot. The base portion 101 may be, for example, a flat plate-shaped component or a cuboid-shaped component connected to the wheel leg portion of the robot. For example, one end of the wheel leg portion 103 is connected to the base portion 101 and the other end is connected to the driving wheels 104. The base portion 101 is equipped with a power output apparatus, such as a motor (not shown in the figure), and the power output apparatus can be used to drive joints of the wheel leg portion 103 to provide power. It is to be understood that, according to actual needs, the robot may, for example, further include a base portion connected to the wheel leg portion or additional components disposed on the base portion. It is to be understood that the above only gives a structural example of a robot, and the embodiments are not limited to the specific components of the robot and connection manners thereof.

The driving wheels 104 in the wheel leg portion 103 enable the wheel-legged robot 100 to walk and perform wheeled movement. In some embodiments, the wheel-legged robot 100 may further include a controllable additional component (for example, a tail), where the tail may be used to balance the wheel-legged robot or assist in the movement of the wheel-legged robot. For example, the tail can help the wheel-legged robot maintain balance during movement. In some embodiments, the wheel-legged robot may further include a controllable robotic arm, and the robotic arm may be used to perform operating tasks such as carrying and picking up. The wheel-legged robot may include a bipedal wheel-legged robot, a quadrupedal wheel-legged robot, and the like. This is not limited herein.

For example, the wheel leg portion 103 is a parallel structure leg (where two legs of the bipedal wheel-legged robot 100 are balanced). Referring to FIG. 1A, the wheel leg portion 103 of the robot 100 includes a left wheel leg portion and a right wheel leg portion. Each of the left wheel leg portion and the right wheel leg portion includes a driving wheel and a central shaft connected to the driving wheel, and two parallel legs configured to achieve motion control for the driving wheel. For example, the left wheel leg portion includes a left driving wheel, and a first left wheel leg portion and a second left wheel leg portion connected in parallel; and the right wheel leg portion includes a right driving wheel, and a first right wheel leg portion and a second right wheel leg portion connected in parallel. As shown in FIG. 1A, the left wheel leg portion and the right wheel leg portion have a mirror-symmetrical structure.

For example, the driving wheel may be a single wheel, two wheels, four wheels or other number of driving wheel configurations, and each driving wheel can be controlled by two legs connected in parallel or a plurality of legs connected in series. It is to be understood that the embodiments are not limited to the specific composition type of the left and right wheel leg portions and the number of driving wheels. In some embodiments, both the left wheel leg portion and the right wheel leg portion have a single wheel leg configuration, and the single wheel leg configuration means that the wheel leg portion only includes a single driving wheel.

For example, in some embodiments, the left wheel leg portion and the right wheel leg portion may include the same number of joints and have the same joint configuration, or according to actual needs, the left wheel leg portion and the right wheel leg portion may have different number of joints and have different joint configurations. The embodiments are not limited to the specific number of joints and joint configurations of the left wheel leg portion and the right wheel leg portion. By using the example shown in FIG. 1A as an example, the left wheel leg portion and the right wheel leg portion each include five joints, and each joint has two rotational degrees of freedom. Changes in a height of the center of mass of the wheel leg portion or the base portion and an inclination angle of the base portion can be adjusted by adjusting each joint of the wheel leg portion 103.

Compared with series structural legs, parallel structural legs have stronger stiffness and can withstand possible impacts during complex movement. When in contact with the ground, the driving wheels 104 can provide the wheel-legged robot 100 with the ability to slide. Still referring to FIG. 1A, in some embodiments, the bipedal wheel-legged robot 100 may further include an additional component 102, and the additional component 102 is connected to the base portion 101. The additional component 102 may be equipped with a driven wheel 105. The additional component 102 may include a rotational degree of freedom. The movement of the additional component 102 also affects the changes of the base portion 101 and the wheel leg portion 103. For example, the additional component 102 can drive the base portion so that the base portion has a certain rotation speed. It can be seen that the balance and posture of the robot 100 can be adjusted by adjusting the position of the additional component 102. The wheel-legged robot 100 has flexibility of both a wheeled robot and a legged robot, and thus can move quickly on flat ground and traverse rough roads.

In some embodiments, the wheel-legged robot as shown in FIG. 1B can be used. The wheel-legged robot can be configured with eight driving motors, of which four motors are disposed on the base portion, and two motors are disposed on the controllable additional component (for example, the tail), and a motor is disposed on each of the two driving wheels. By using the five-bar linkage wheel leg portion, the left wheel leg portion and the right wheel leg portion are each driven by the two motors on the base portion, and each five-bar linkage wheel leg portion can move along the wheel leg plane. The plane of the wheel leg remains perpendicular to the plane of the base. In addition to two-wheel balancing, the wheel-legged robot also has the ability to flexibly switch between two-wheel mode and three-wheel mode. For example, by adjusting the motor on the additional component, as shown in (b) and (c) of FIG. 1B, the driven wheel and the two driving wheels on the wheel-legged robot work together. In addition, the posture of the base portion of the wheel-legged robot may be adjusted by changing a height (that is, a distance between the center of each driving wheel and the base portion in the wheel leg plane) of each wheel leg portion by rotating the motor of the base portion, as shown in (a) and (b) in FIG. 1B. Therefore, through the optimized mechanical design of the wheel leg portion, the wheel-legged robot can complete tasks such as crossing obstacles, jumping and flipping, demonstrating a powerful ability to achieve dynamic movement.

To facilitate further description of some embodiments, meanings of various operators and sets that may be used below are briefly explained herein.

In some embodiments, R represents a set of real numbers. $|\cdot|$ represents the Euclidean norm of a vector. $\nabla$ represents taking a partial derivative of a variable. The superscript T represents taking the transpose of a matrix. Bold letters represent vectors or matrices. Italic letters represent scalars. $e_1$ represents a vector in which the first element is equal to 1 and the other elements are equal to 0, and $e_2$ represents a vector in which the second element is equal to 1 and the other elements are equal to 0.

To sum up, the solutions provided in some embodiments involve artificial intelligence, robot control, and other technologies. Some embodiments are further described below with reference to the accompanying drawings.

Figure 1C:
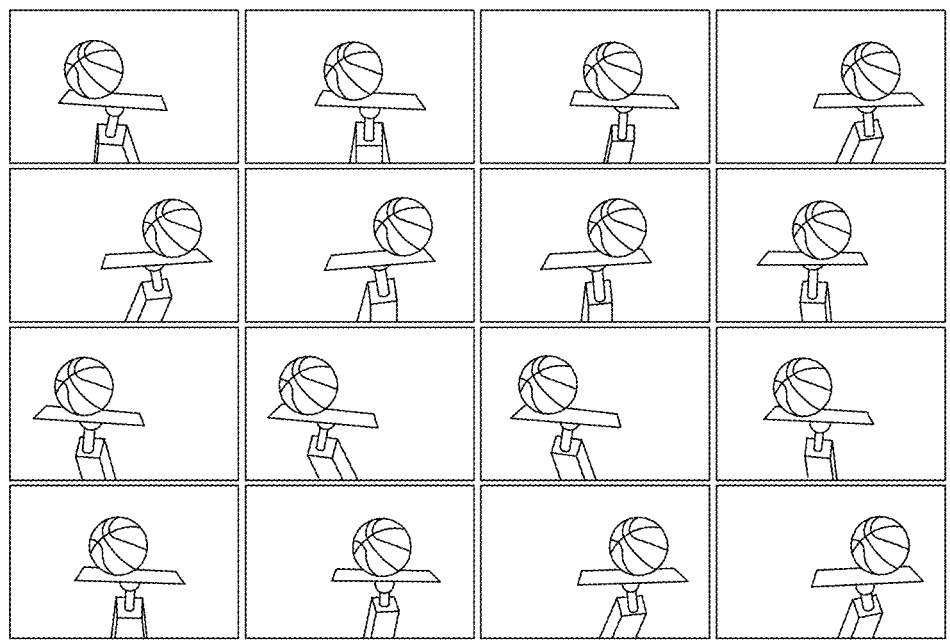
FIG. 1C is a schematic diagram of using a robotic arm for sphere balance according to some embodiments.
Figure 1D:
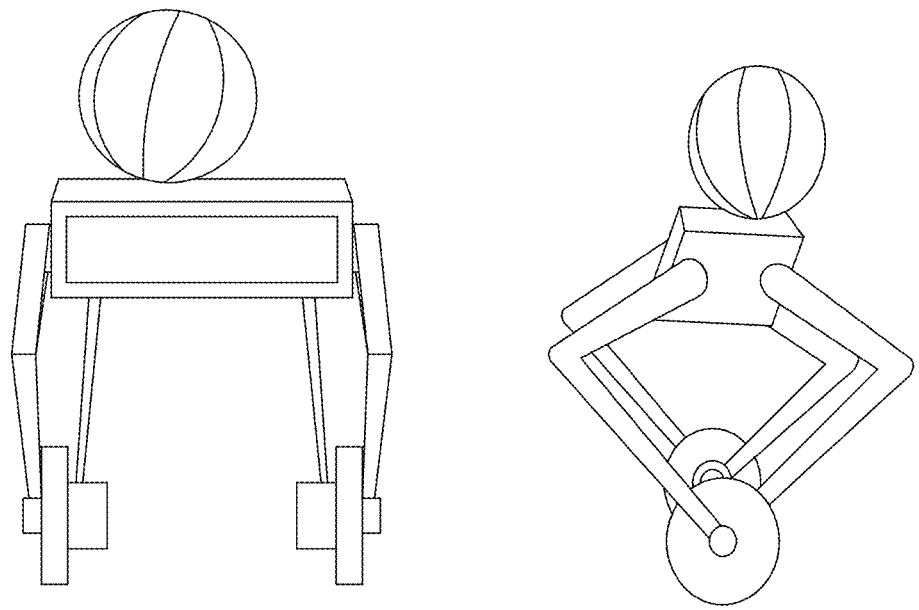
FIG. 1D is a schematic diagram of using a wheel-legged robot for sphere balance according to some embodiments.

For a sphere balance scenario, there are attempts to use robotic arms to achieve a sphere balance task. For example, FIG. 1C is a schematic diagram of using a robotic arm for sphere balance according to some embodiments. As shown in FIG. 1C, a robotic arm balances a basketball on a flat surface at an end. However, as a robot with a fixed base, the robotic arm does not require additional stability control, and for the robotic arm, sphere balance is much more difficult than sphere balance on an unstable wheel-legged robot. Therefore, the method for controlling sphere balance on a robotic arm cannot be applied to the sphere balance control scenario described herein. The robot control method according to some embodiments is directed to a control system that balances a rigid sphere on the surface of the base portion of the wheel-legged robot. The wheel-legged robot can run on uneven roads, the surface of the base portion of the wheel-legged robot is flat, and the balanced rigid sphere may be a sphere of various types (including material, size, and the like). For example, FIG. 1D is a schematic diagram of using a wheel-legged robot for sphere balance according to some embodiments. As shown in FIG. 1D, a basketball is placed on a plane of a base portion of a wheel-legged robot. A posture of the wheel-legged robot needs to be controlled so that the basketball can maintain balance on the plane of the base portion of the robot.

In the research on a sphere balance task of the wheel-legged robot, there are methods for adding the sphere balance task to a whole-body control framework of the wheel-legged robot to realize the sphere balance task. For example, a proportional-integral-derivative (PID) controller may be used as a sphere balance controller to perform the sphere balance task. However, in such a robot control method, because the sphere balance system (including the sphere and the wheel-legged robot) is a nonlinear system, and the PID controller is a linear controller, the control effect has certain flaws in theory. In addition, the PID controller is a model-free controller, and corresponding parameters of the PID controller often need to be manually adjusted in application. Therefore, the stability of the PID controller has not been theoretically proven, and after different spheres are switched, the controller parameters most likely need to be re-tuned to ensure stability of the sphere balance task.

As a kind of non-prehensile operation, the sphere balance scenario is a rolling non-prehensile task, and passivity based control (PBC) is considered as a possible unified framework for rolling non-prehensile tasks. The core principles lie in energy shaping and damping injection. For a fully driven system, in an energy shaping stage, target potential energy of a close-loop system is shaped so that the target potential energy has a unique global minimum in a desired balanced state. In the damping injection stage, dissipation characteristics are modified to maintain passivity of the close-loop system. However, for an under-actuated system, arbitrary shaping of potential energy is ineffective. In some cases, this problem can be solved by simultaneously adjusting kinetic energy of the system, such as interconnection and damping assignment (IDA). A major difficulty in implementing IDA-PBC is the need to solve partial differential equations during the controller design process. Although mathematical derivation is difficult, the energy-based nature makes the parameters of the controller closely related to the state of the robot, which facilitates an easier parameter tuning process. In recent research, IDA-PBC has achieved good control performance on different types of robots.

Based on this, some embodiments provide a robot control method and apparatus, a robot, a computer-readable storage medium, and a computer program product. Balance control for a base portion of a wheel-legged robot and a sphere on the wheel-legged robot is added to a whole-body control (WBC) framework of the wheel-legged robot, so that the sphere maintains balance during movement of the robot, thereby implementing the sphere balance task of the wheel-legged robot. An IDA-PBC algorithm is applied to a sphere balance non-prehensile operation on the wheel-legged robot, and to stabilize the entire robot system (including the robot and the sphere), the sphere balance control is designed in the whole-body control framework, thereby improving the robustness and flexibility of the wheel-legged robot.

According to the robot control method provided in some embodiments, passivity based control for a nonlinear system formed by both a base portion of a wheel-legged robot and a sphere on the base portion is added to whole-body control for the wheel-legged robot (also referred to as a robot below), to determine base control information for maintaining balance of the sphere, and determine control for each joint of the wheel-legged robot based on the base control information. In this way, the wheel-legged robot can maintain balance of the sphere during movement, thereby implementing the sphere balance task of the wheel-legged robot. According to the robot control method provided in some embodiments, the wheel-legged robot can balance different rigid spheres on roads of various terrains, and can ensure stability of the sphere balance system after replacing a different sphere only by updating corresponding parameters of the sphere to the controller, without re-adjusting the controller.

Figure 2:
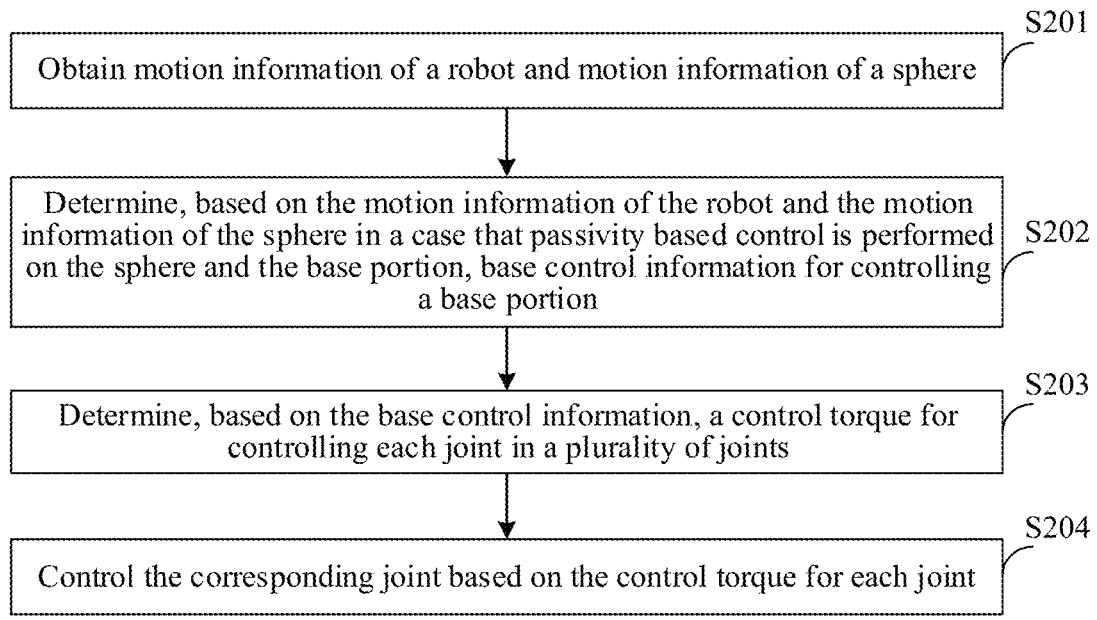
FIG. 2 is a flowchart of a robot control method according to some embodiments.
Figure 3A:
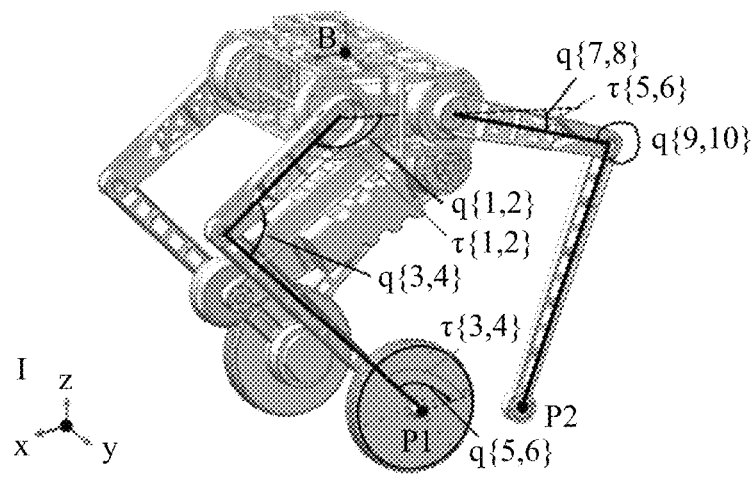
FIG. 3A is a schematic diagram of structure labels of a robot according to some embodiments.

FIG. 2 is a flowchart of a robot control method according to some embodiments. FIG. 3A is a schematic diagram of structure labels of a robot according to some embodiments.

The robot control method can be applied to any robot that includes a base portion and a wheel leg portion, where the wheel leg portion includes driving wheels and a base portion, and the wheel leg portion includes a plurality of joints. For case of description, the method is further described below by using the robot 100 shown in FIG. 1A as an example. To facilitate the description of various feature quantities involved in the method, the robot 100 in FIG. 1A is further labeled with reference to FIG. 3A. As shown in FIG. 3A, to facilitate the control for the robot, the joints of the robot can be further labeled to facilitate establishment of a dynamic model of the robot. The dynamic model is configured for representing changing relationships between each joint and a center of mass angle, an angular velocity, an angular acceleration, a joint torque, an external contact force during movement of the robot. For example, the dynamic model can describe the foregoing changing relationships from the perspective of energy change.

For example, as shown in FIG. 3A, the complex robot 100 shown in FIG. 1A can be labeled in a generalized coordinate system of the robot. For ease of labeling, in FIG. 3A, centers $P_1$ and $P_2$ of the driving wheels are shown as two separate points. A person skilled in the art is to understand that $P_1$ and $P_2$ are essentially the same point.

In FIG. 3A, joints involved in the wheel leg portion are labeled with $q_{\{\cdot,\cdot\}}$ and $\tau_{\{\cdot,\cdot\}}$ respectively, where que represents a joint rotation angle and Tea represents a joint torque. For example, $q_{\{1,2\}}$ represents a joint rotation angle between a first link of the left wheel leg portion of the robot and the base portion, and $\tau_{\{1,2\}}$ represents a joint rotation torque between the first link of the left wheel leg portion of the robot and the base portion. Although not shown in FIG. 3A, an angle and a rotational torque of the tail joint can be set correspondingly.

For any robot with a base portion, generalized coordinates of the robot may be represented by $q=[q_{fb}^T, q_j^T]^T$. The generalized coordinates $=[q_{fb}^T, q_j^T]^T$ of the robot include the posture $q_{fb} \in \mathbb{R}^3 \times SO(3)$ of the base portion and $n_j$ joint angles $q_j=[q_1, q_2, \ldots, q_{n_j}]^T$. For the robot shown in FIG. 1A and FIG. 3A, generalized coordinates q of the robot can also be obtained similarly, where $n_j=12$, and $q_i$ may be one of any joints represented by $q_{\{\cdot,\cdot\}}$ in FIG. 3A.

Figure 3B:
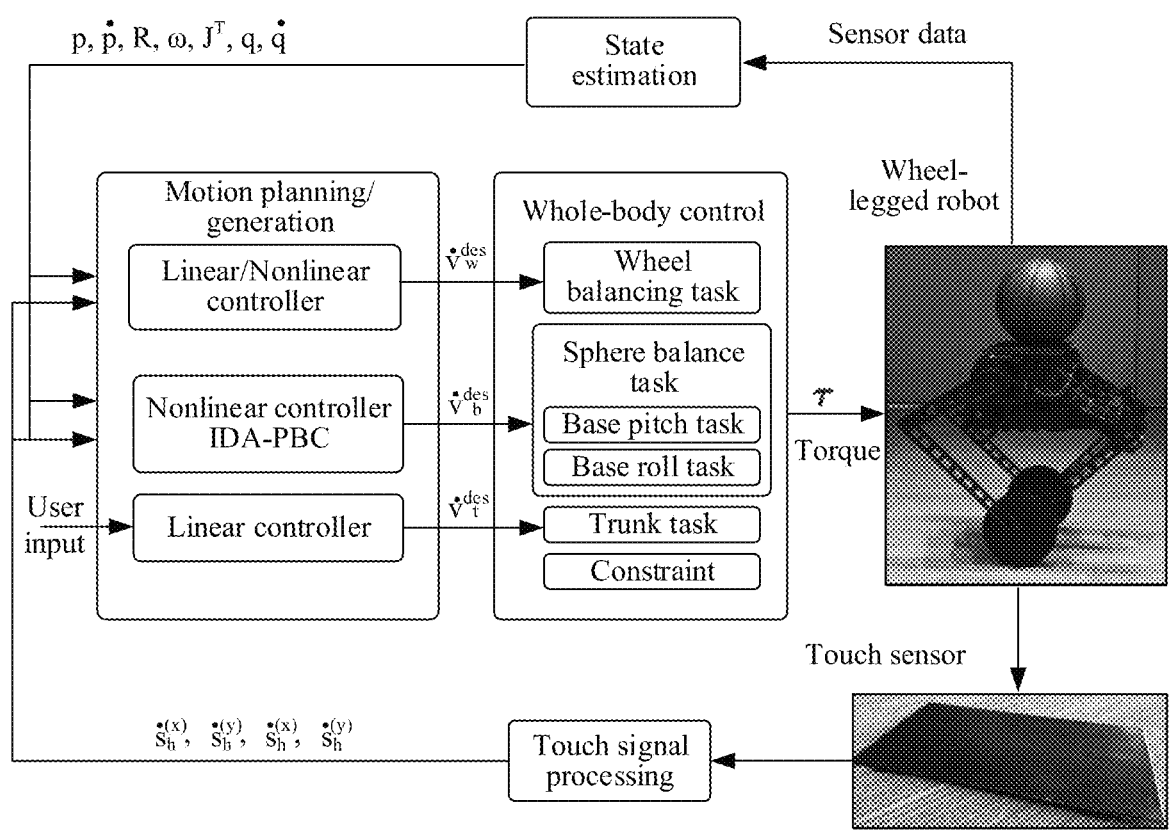
FIG. 3B is a control architecture diagram of a robot based on whole-body control according to some embodiments.

On the basis of obtaining the robot configuration, a traveling process of the robot can be taken into consideration, a corresponding control architecture and control tasks can be set for the robot, and such control architecture and control tasks can be described through mathematical language. The foregoing control architecture and control tasks are further described below with reference to FIG. 3B. FIG. 3B is a control architecture diagram of a robot based on whole-body control according to some embodiments. By using the robot labeled in FIG. 3A as an example, FIG. 3B shows a plurality of exemplary control tasks for the robot and a correlation between the control tasks. The combination and association of these exemplary control tasks is also referred to as dynamic whole-body dynamics control corresponding to the robot.

The robot control method provided in some embodiments can be performed by a controller in the robot. The robot control method according to some embodiments is described below with reference to the flowchart of the robot control method shown in FIG. 2.

In operation S201, motion information of the robot and motion information of the sphere are obtained.

As shown in FIG. 3B, motion data of the wheel-legged robot and motion data of the sphere on the robot can be obtained through sensors, thereby generating the motion information for robot control through corresponding state estimation and data processing respectively.

The motion data includes raw sensor data of robot motion obtained through various sensors and raw sensor data of motion of the sphere on the base portion of the robot, and the motion information includes input information for subsequent motion planning or generation processing. The motion information is information obtained through state estimation and signal processing of these sensor data and used for robot motion planning. As shown in FIG. 3B, each motion information is described below.

According to some embodiments, a touch sensor array may be preset on the surface of the base portion, and the motion data of the sphere is obtained through the touch sensor array. A resolution of the touch sensor array may be pre-designed by jointly optimizing accuracy of speed estimation of the touch sensor array and an update frequency of the motion information of the sphere.

In some embodiments, unlike most non-prehensile rolling experiments, the state of the sphere can be updated by a touch sensor array instead of a torque sensor or a visual servo. To realize the non-prehensile operation of the wheel-legged robot in different terrain conditions, a durable touch sensor array with a large range, high sensitivity, high spatial resolution, and fast response speed is needed to provide sufficiently accurate motion information of the sphere. Similar to electronic skin, the spatial resolution of the touch sensor array can neither be too high nor too low, and parameters of the touch sensor array are highly dependent on environments and scenarios of the robot application. Therefore, the spatial resolution can be evaluated during the parameter design stage of the touch sensor array by optimizing the following formula (1):

$$\operatorname*{argmin}_{d=\{d_x,d_y\}} z = \sum_{i=0}^{n_x-1}\sum_{j=0}^{n_y-1} \|v_{i,j}^{cal} - v_{i,j}^{act}\|_{W_v}^2 + \|T_s\|_{W_T}^2 \qquad (1)$$

$v_{i,j}^{cal}=[v_{x,j}^{cal}\ v_{i,y}^{cal}]^T$ and $v_{i,j}^{act}=[v_{x,j}^{act}\ v_{i,y}^{act}]^T$ respectively represent a calculated relative speed and an actual relative speed of the sphere and the surface of the base portion of the robot in x and y directions, and $d_x$ and $d_y$ are a width and a length of each touch module. Assuming that $L_x$ and $L_y$ are a width and a length of a coverage area of the touch sensor array, $$n_x = \frac{L_x}{d_x} \text{ and } n_y = \frac{L_y}{d_y}$$

may be used to describe the size of the touch sensor array. Therefore, $T_s = n_x n_y t_s + t_d$ is sampling time of the entire touch sensor array, where $t_s$ is sampling time of each touch point, and $t_d$ is a signal transmission delay. Therefore, through optimization according to the trade-off between the accuracy of the touch sensor array and the update frequency, the first term $\|v_{i,j}^{cal} - v_{i,j}^{act}\|_{W_v}^2$ in formula (1) above means that the controller design has good input signal quality by minimizing an error in speed estimation, and the second term $\|T_s\|_{W_T}^2$ is used to ensure a fast sampling rate in data acquisition and signal processing.

In some embodiments, the touch sensor array can be covered on the surface of the robot, such as the surface of the base portion of the wheel-legged robot. For example, for a wheel-legged robot whose upper surface size of the base portion is 0.2 m×0.4 m, $L_x$=200 mm and $L_y$=400 mm may be set. Therefore, after the resolution optimization as described above, a piezoresistive sensor array of $n_x$(16)×$n_y$ (32) with a spatial resolution of $d_x$=$d_y$=12.5 mm may be designed.

Figure 4:
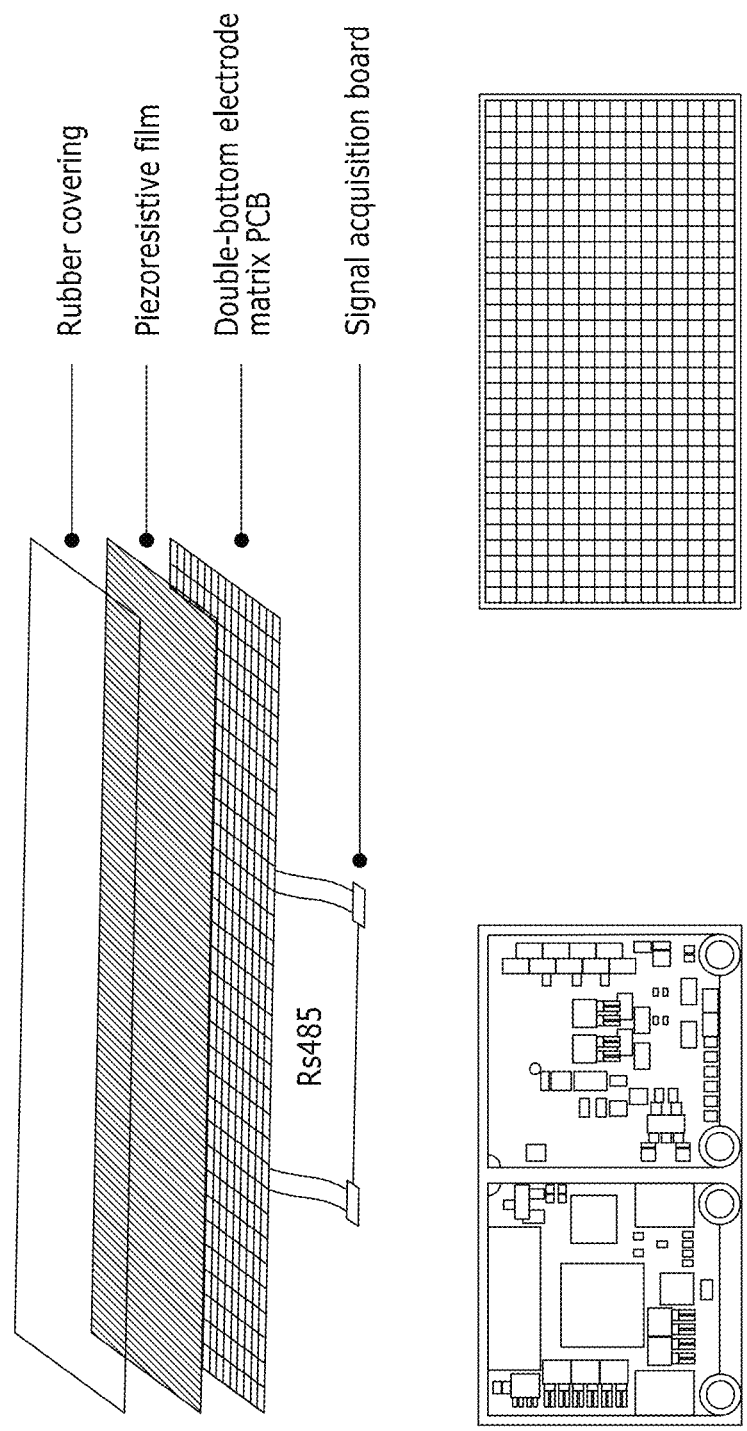
FIG. 4 is a schematic structural diagram of a touch sensor array according to some embodiments.

FIG. 4 is a schematic structural diagram of a touch sensor array according to some embodiments. As shown in FIG. 4, the touch sensor array used in some embodiments may include a rubber covering, a piezoresistive film (PRF), a double-bottom electrode matrix PCB, and a signal acquisition board. The piezoresistive film is synthesized at low temperatures by mixing multi-walled carbon nanotubes with thermoplastic polyurethane elastomers, in which self-formed microstructures on the upper surface enable high sensitivity, fast response speed, and excellent cycling performance. By integrating a 50 um thick PRF with two 120 mm×120 mm size 16×16 double-bottom electrode matrix PCBs, a 16×32 sensor array with 12.5 mm spatial resolution and high sensitivity can be realized, thereby meeting the foregoing resolution requirements. In addition, the signal acquisition board can use two 16×16 signal acquisition boards to realize the designed 16×32 array signal acquisition function through master-slave communication. Each signal acquisition board may be designed to scan 16 lines simultaneously at a speed of 10 us, and the switching time is 12 us, achieving a speed of 16×(10+12)=352 us/frame. Therefore, with an initial filter, the 16×32 sensor array can achieve an acquisition speed of 1 kHz, which also meets the foregoing requirements for the sampling rate. Certainly, it is to be understood that the foregoing touch sensor array shown in FIG. 4 is only used as an example in this embodiment. The robot control method of some embodiments can also use other sensors to obtain the motion information of the sphere on the robot. This is not limited herein.

Therefore, the motion information of the robot and the motion information of the sphere are obtained in the foregoing manner, and then motion planning and generation can be performed based on the obtained motion information, to control the robot to adjust control parameters of each part of the body according to a planned motion state.

In operation S202, based on the motion information of the robot and the motion information of the sphere in a case that passivity based control being performed on the sphere and the base portion, base control information for controlling the base portion is determined, the sphere remaining balanced on the base portion in a case that the base portion is controlled based on the base control information.

In some embodiments, to stabilize the entire robot system (including the robot and the sphere), the robot can be controlled as a whole under the whole-body control framework. The whole-body control framework is shown in FIG. 3B. The whole-body control includes sphere balance control. That is, sphere balance control is designed in the whole-body control framework to improve the robustness and flexibility of the robot. In the whole-body control in some embodiments, a variety of control tasks can be considered, including but not limited to a wheel balancing task, a trunk task, and a sphere balance task for implementing sphere balance control. The sphere balance task can be realized through rotation of the base portion of the robot in a pitch direction and a roll direction. That is, the sphere balance task may include a base pitch task and a base roll task for the base portion of the robot. Such control tasks can be understood as sub-functions for realizing the robot. For example, the wheel balancing task is a function for ensuring the overall balance of the wheel-legged robot; the trunk task is a function for controlling a height change of the robot and a function for controlling a tail angle change; and the base pitch task and the base roll task are functions for adjusting pitch and roll angles of the base portion of the robot. As shown in FIG. 3B, each task in whole-body control can receive desired motion information generated through motion planning (for example, a desired acceleration of a corresponding joint), and perform combined control optimization under the whole-body control framework based on the desired motion information, to determine an optimal robot control scheme.

In some embodiments, a desired acceleration $\dot{v}_t^{des}$ corresponding to the trunk task can be calculated by using a linear controller (such as a PID controller) based on an error between a target value inputted by a user and a true value. Due to non-minimum phase characteristics caused by under-actuated characteristics of a robot balance model, input $\dot{v}_w^{des}$ corresponding to the wheel balancing task needs to be obtained through a specially designed linear or nonlinear controller. There have been relevant studies on the controller design of this part, and this is not described in detail again herein.

In some embodiments, passivity based control for the sphere and the base portion may be passivity based control for a nonlinear system formed by the sphere and the base portion. The passivity based control is achieved by constructing an appropriate mapping relationship between input and output to enable the close-loop system to meet a passivity condition, so that a nonlinear controller for the nonlinear system may be designed based on the passivity theory, and finally the nonlinear system can reach a balanced state to complete the sphere balance task in some embodiments.

For the sphere balance task in some embodiments, the implementations of the base pitch task and the base roll task are described in detail below. By controlling the pitch and roll angles of the base portion, the sphere can move and balance on the upper surface of the base portion. Therefore, the controller for this task can be determined by using an IDA-PBC control method. As shown in FIG. 3B, the output of the nonlinear controller (IDA-PBC controller) designed in some embodiments can be input into a whole-body control module for calculation as a desired acceleration of the base portion in the pitch and roll directions, to obtain a control torque of each motor of the robot.

According to some embodiments, operation S202 may include: determining, through interconnection and damping assignment-passivity based control and based on the motion information during movement of the robot and the motion information of the sphere, the control torque for controlling the base portion; and determining, based on the control torque for controlling the base portion, the base control information for controlling the base portion, where the base control information includes control information for controlling an acceleration of the base portion in a pitch direction and control information for controlling an acceleration of the base portion in a roll direction.

Figure 5:
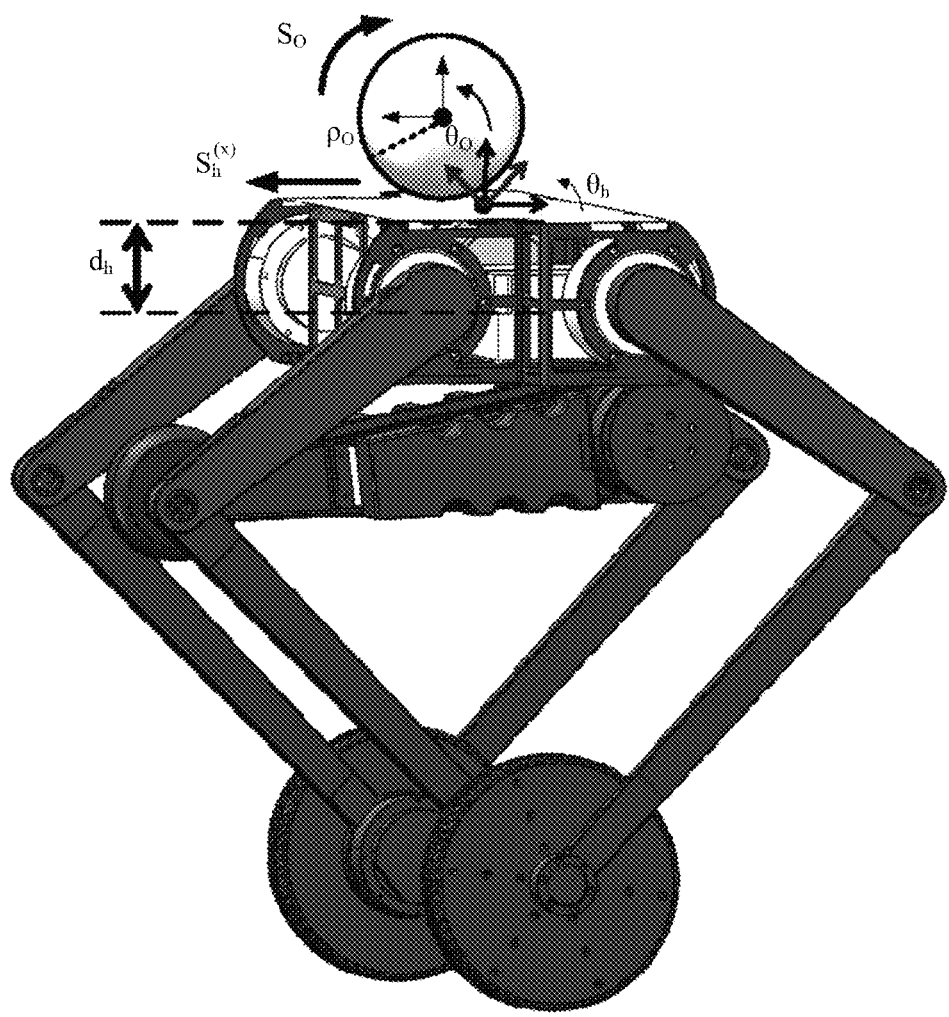
FIG. 5 is a schematic diagram of a simplified model of a sphere balance system according to some embodiments.

The following describes sphere balance control on a wheel-legged robot as an example. FIG. 5 is a schematic diagram of a simplified model of a sphere balance system according to some embodiments. In sphere balance control on a wheel-legged robot, a base portion and a sphere of the wheel-legged robot may be regarded as a nonlinear system. The sphere balance control in this case may be regarded as the balance control for the nonlinear system, so that the nonlinear system can reach a balanced state when the sphere reaches a desired state on the base portion, where the balance control for the nonlinear system can be achieved by controlling a posture of the base portion, including controlling pitch and roll angles of the base portion.

As shown in FIG. 5, a non-prehensile sphere balance problem of the wheel-legged robot can be modeled according to a simplified model on a sagittal plane, where the posture (that is, the pitch angle of the base portion) of the base portion relative to the horizontal plane may be represented by $\theta_h$, a contact position of the sphere on the sagittal plane with the surface of the base portion may be defined as $s_h$, a distance between the center of mass of the base portion and the surface of the base portion may be defined as $d_h$, a radius and an angle of rotation of the sphere may be defined as $\rho_o$ and $\theta_o$, respectively, and a rotation arc length of the sphere may be defined as $s_o$.

According some embodiments, the determining, through interconnection and damping assignment-passivity based control and based on the motion information during movement of the robot and the motion information of the sphere, the control torque for controlling the base portion may include: establishing a current combined system based on current combined energy of the sphere and the base portion, where the current combined energy of the sphere and the base portion includes current combined kinetic energy and current combined potential energy of the sphere and the base portion; determining a desired combined system of the sphere and the base portion, where the desired combined system has desired combined energy, the desired combined energy includes desired combined kinetic energy and desired combined potential energy of the sphere and the base portion, the desired combined kinetic energy is designed such that the sphere is always located on the base portion, and the desired combined potential energy is designed to have a minimum value in a case that the sphere reaches a target state on the base portion; and determining, based on the current combined energy and the desired combined energy, the control torque for controlling the base portion, where the current combined system is converted into the desired combined system under the action of the control torque. According to some embodiments, the current combined system may be represented in a port-Hamiltonian form.

In some embodiments, the nonlinear system can be modeled according to a Euler-Lagrangian method. In some embodiments, the nonlinear system can be modeled based on kinetic energy and potential energy of the base portion of the robot and the sphere, and the nonlinear system may be represented in a port-Hamiltonian form based on the kinetic energy and the potential energy.

For example, in some embodiments, for the nonlinear system at a current moment, assuming that the inertia $I_h$ of the base portion of the robot and the inertia $I_o$ of the robot, as well as the mass $m_h$ of the base portion and the mass $m_o$ of the sphere are known, and $q=[\theta_h, s_h]^T$ is defined, the kinetic energy (that is, the current combined kinetic energy above) T of the base portion of the robot and the sphere may be represented as the following formula (2):

$$T = \frac{1}{2}\left(I_h \dot{\theta}_h^2 + m_h \dot{p}_h^T(\theta_h)\dot{p}_h(\theta_h) + m_o \dot{p}_o^T \dot{p}_o + I_o \dot{\theta}_o^2\right) \qquad (2)$$
$$= \frac{1}{2} p^T M^{-1}(q) p$$

where $p=M(q)\dot{q}$, and $$M(q) = \begin{bmatrix} b_{11}(q) & b_{12}(q) \\ b_{12}^T(q) & b_{22}(q) \end{bmatrix}, \qquad (3)$$

where $$b_{11}(q) = I_h + I_o + m_h \left(\frac{\partial p_h}{\partial \theta_h}\right)^T \frac{\partial p_h}{\partial \theta_h} + m_o Y^T(q)\gamma(q) \qquad (4)$$

$$b_{12}(q) = \frac{I_o}{\rho_0} + m_o \gamma^T(q)\eta(q)$$

$$b_{22}(q) = \frac{I_o}{\rho_0^2} + m_o \eta^T(q)\eta(q),$$

where for a solid ball, $I_o = \frac{2}{5} m_o \rho_o^2$; and for a hollow ball, $I_o = \frac{2}{3} m_o \rho_o^2$.

In addition, $$\gamma(q) = \begin{bmatrix} -(\rho_o + d_h)\cos(\theta_h) + s_h \sin(\theta_h) \\ -(\rho_o + d_h)\sin(\theta_h) - s_h \cos(\theta_h) \end{bmatrix}, \text{ and} \qquad (5)$$

$$\eta(q) = -[\cos(\theta_h), \sin(\theta_h)]^T \qquad (6)$$

The potential energy (that is, the current combined potential energy above) V of the base portion of the robot and the sphere may be represented as the following formula (7):

$$V(q) = g \cdot e_2^T (m_o p_o(q) + m_h P_h(q)) \qquad (7),$$

where g represents the gravity acceleration.

Therefore, the nonlinear system may be represented in the port-Hamiltonian form as the following formula (8):

$$\begin{bmatrix} \dot{q} \\ \dot{p} \end{bmatrix} = \begin{bmatrix} o_n & I_n \\ -I_n & o_n \end{bmatrix} \nabla H(q, p) + \begin{bmatrix} o_{n \times m} \\ G(q) \end{bmatrix} u \qquad (8)$$

where u is an input torque, n=2, m=1, $G=e_1$, and $$H(q,p) = \frac{1}{2} p^T M^{-1}(q) p + V(q) \qquad (9).$$

A target state of the nonlinear system may be designed, that is, a desired combined system. Desired combined energy of the desired combined system may include desired combined kinetic energy and desired combined potential energy of the sphere and the base portion. The desired combined kinetic energy may be designed such that the sphere is always located on the base portion (for example, such that the pitch angle of the base portion is $\theta_h$ $$\in \left(-\frac{\pi}{2}, \frac{\pi}{2}\right)),$$

and the desired combined potential energy may be designed to have a minimum value when the sphere reaches the target state on the base portion, so that the nonlinear system reaches a balanced state when the sphere reaches the target state.

Therefore, to design a controller by using a passivity based control method, the foregoing desired combined system may be represented in a port-Hamiltonian form as the following formula (10):

$$\begin{bmatrix} \dot{q} \\ \dot{p} \end{bmatrix} = \begin{bmatrix} O_n & M^{-1}(q) M_d(q) \\ -M_d(q) M^{-1}(q) & J_2 \end{bmatrix} \nabla H_d(q, p) \qquad (10)$$

where the subscript d represents a desired value of a corresponding quantity of the foregoing current combined system in the desired combined system, $$H_d(q, p) = \frac{1}{2} p^T M_d^{-1}(q) p + V_d(q) \qquad (11)$$

and $$M_d(q) = \begin{bmatrix} -\frac{k_a \bar{b}^2}{k b_{12} - b_{22}} & -\text{sinc}(\theta_h)\bar{b} \\ -\text{sinc}(\theta_h)\bar{b} & -\text{sinc}(\theta_h)(k b_{12} - b_{22}) \end{bmatrix} \qquad (12)$$

where $$\bar{b} = k b_{11}(s_h) - b_{12}.$$

Therefore, in the desired combined system, the desired combined potential energy $V_d$ may be designed as the following formula (13):

$$V_d(q, c_2) = \frac{m_o g \theta_h^2}{2k} - \cos\left(\frac{k_f}{k}[\theta_h + k(s_h - s_h^*)]\right) \qquad (13)$$

Therefore, in some embodiments, the control torque u used by the nonlinear controller IDA-PBC for the sphere balance task may be represented as a combination of an energy shaping term $u_{es}$ and a damping injection term $u_{di}$ as shown in the following formula (14):

$$u = u_{es} + u_{di} \qquad (14)$$

where $$u_{di} = -K_v G^T \nabla_p H_d(q, p) \qquad (15)$$

and $$u_{es} = (G^T G)^{-1} G^T \left[\nabla_q H(q, p) - \right. \qquad (16)$$
$$\left. M_d(q) M^{-1}(q) \nabla_q H_d(q, p) + J_2(q, p) M_d^{-1}(q) p \right]$$

where $$J_2(q, p) = \begin{bmatrix} 0 & j_2(q, p) \\ -j_2(q, p) & 0 \end{bmatrix} \qquad (17)$$

and $$J_2(q, p) = \left(2 e_1^T M_d^{-1}(q) p\right)^{-1} \left[e_2^T \nabla_q (p^t M^{-1}(q) p) - \right. \qquad (18)$$
$$\left. e_2^T M_d(q) M^{-1}(q) \nabla_q (p^t M_d^{-1}(q) p) \right]$$

As described above, the determined control torque u for controlling the base portion represents the overall control for the base portion of the robot. Therefore, to implement IDA-PBC in the whole-body control framework, the control torque u may be converted into an input acceleration of the whole-body control module shown in FIG. 3B.

According to some embodiments, the determining, based on the determined control torque for controlling the base portion, the base control information for controlling the base portion may include: converting, according to the current combined system in the port-Hamiltonian form, the determined control torque for controlling the base portion into desired accelerations of the base portion in the pitch direction and in the roll direction as the base control information for controlling the base portion.

In some embodiments, according to the current combined system in the port-Hamiltonian form, the balance control for the current combined system based on the control torque may be represented as the following formulas (19) and (20):

$$b_{11}(q)\ddot{\theta}_h + b_{12}(q)\ddot{s}_h + C_1(q,p) - G_1(q) = u \quad (19)$$

$$b_{12}(q)\ddot{\theta}_h + b_{22}(q)\ddot{s}_h + C_2(q,p) - G_2(q) = 0 \quad (20)$$

where $\ddot{\theta}_h$ represents an angular acceleration of the base portion of the robot and $\ddot{s}_h$ represents an acceleration of the sphere on the surface of the base portion. The foregoing formulas (19) and (20) may be regarded as respectively corresponding to control for the angular acceleration $\ddot{\theta}_h$ of the base portion of the robot based on the control torque u and control for the acceleration $\ddot{s}_h$ of the sphere on the surface of the base portion. Due to the under-actuated characteristics of sphere balance, the right side of the equation shown in formula (20) is zero, that is, the control torque does not act directly on the sphere, but implements sphere balance through the base portion.

$$b_{11}(q) = I_h + I_o + m_o(\rho_0 + d_h)^2 + m_o s_h^2, \quad (21)$$

$$b_{12}(q) = \frac{I_o}{\rho_0} + m_o \rho_0 + m_o d_h,$$

$$b_{22}(q) = \frac{I_o}{\rho_0^2} + m_o,$$

$$C_1(q, p) = 2 m_o s_h \dot{s}_h \dot{\theta}_h,$$

$$C_2(q, p) = -m_o \dot{\theta}_h^2 s_h,$$

$$G_1(q) = m_o g[(\rho_0 + d_h)\sin\theta_h + s_h \cos\theta_h],$$

$$G_2(q) = m_o g \sin\theta_h.$$

Therefore, with reference to the foregoing relationship, the angular acceleration $\ddot{\theta}_h$ of the base portion of the robot can be obtained by using the following formula (22):

$$\left[b_{11} - \frac{b_{12}^2}{b_{22}}\right]\ddot{\theta}_h + b_{12}\frac{G_2 - C_2}{b_{22}} - G_1 + C_1 = u \text{ where} \quad (22)$$

$$u = u_{es} + u_{di}.$$

By solving the foregoing formula (22), the angular acceleration $\ddot{\theta}_h$ of the base portion of the robot corresponding to the foregoing control torque u can be determined, that is, the desired accelerations (that is, $\dot{v}_b^{des}$ in FIG. 3B) of the base portion that is subject to subsequent whole-body control to achieve the sphere balance task in the pitch direction and the roll direction need to be inputted.

In operation S203, based on the base control information, a control torque for controlling each joint in a plurality of joints is determined.

According to some embodiments, the determining, based on the base control information, a control torque for controlling each joint in the plurality of joints may include: determining, based on the motion information of the robot, overall control information for controlling the plurality of joints, so that the robot maintains balance; and determining, based on a constraint condition corresponding to motion of the robot, the overall control information, and the base control information, the control torque for controlling each joint in the plurality of joints. The operation of determining, based on the motion information of the robot, the overall control information for controlling the plurality of joints so that the robot maintains balance actually corresponds to the wheel balancing task in the foregoing whole-body control framework. In other words, in some embodiments, the control information for each joint of the robot can be determined based on the overall control information for implementing the wheel balancing task, the base control information for implementing the sphere balance task, and various constraint conditions of the robot (where in another embodiment, the constraint condition may further include control information for implementing a trunk task). The control information for each joint of the robot may correspond to the finally determined control torque for each joint of the robot. The overall control information for implementing the wheel balancing task corresponds to the input of the wheel balancing task in the whole-body control for the robot, which may include desired acceleration information of each joint of the wheel leg portion of the robot and the driving wheel. The base control information for implementing the sphere balance task corresponds to the input of the sphere balance task in the whole-body control for the robot, which may include desired acceleration information of the base portion of the robot.

In some embodiments, in the whole-body control framework of the robot, the corresponding whole-body control for the robot may be described as controlling each joint of the robot with the goal of minimizing the total input energy to each joint and minimizing an error with a target trajectory while ensuring the balance of the robot. For example, the desired acceleration of the robot can be first determined based on the desired acceleration of the base portion and the desired acceleration of the wheel leg portion determined through a motion planning module. Based on the desired acceleration of the robot, according to dynamic formulas and constraint conditions of the robot, the desired acceleration corresponding to each joint of the robot is then generated. However, it is to be understood that the foregoing only provides one method for generating the desired acceleration, and embodiments are not limited to the specific generation manner of the desired acceleration. Therefore, after the desired acceleration of each joint of the robot is obtained, the robot can be motion controlled based on a determined target joint acceleration of each joint of the robot. For example, in some embodiments, a torque amount corresponding to the joint can be further generated based on the desired acceleration, friction compensation is performed on the torque amount, a joint control current value is generated based on a friction-compensated target torque amount, and the joint control current value is sent to a corresponding joint control motor, thereby outputting the corresponding torque through the joint control motor to control each joint of the robot, and achieving motion control for the robot. However, it is to be understood that the foregoing only provides an exemplary method for controlling robot motion based on the desired acceleration. According to actual needs, other methods can be selected to implement motion control. Embodiments are not limited to the specific manner of implementing motion control based on the desired acceleration.

According to some embodiments, the determining, based on the constraint condition corresponding to motion of the robot, the overall control information, and the base control information, the control torque for controlling each joint in the plurality of joints may further include: calculating, based on the overall control information and the base control information, at least one candidate control torque combination corresponding to each joint that satisfies the constraint condition; determining a value corresponding to a dynamic whole-body dynamics objective function of the robot based on at least one candidate control torque combination corresponding to each joint; and selecting, from at least one candidate control torque combination corresponding to each joint, a candidate control torque combination such that the dynamic whole-body dynamics objective function satisfies a predetermined condition, and determining each candidate control torque in the candidate control torque combination as the control torque for controlling each joint in the plurality of joints.

In some embodiments, considering that the whole-body control for the robot actually allows the robot to follow given reference motion, an objective function of the dynamic whole-body dynamics control for the robot can be determined based on an error between the reference motion of the robot and actual motion.

For example, the dynamic whole-body dynamics control for the robot may be described as controlling each joint of the robot with the goal of minimizing the total input energy to each joint and minimizing an error with a target trajectory while ensuring the balance of the robot. According to some embodiments, the wheel leg portion further includes at least two driving wheels; and parameters of the dynamic whole-body dynamics objective function include at least one of the following: a vector formed by a set of desired accelerations of the base portion in a pitch direction and in a roll direction; a vector formed by a set of desired accelerations of each driving wheel during movement; a vector formed by a set of desired torques set for each joint; a generalized force provided by the ground at a point of contact in a case that the robot is in contact with the ground; and a close-loop force in the wheel leg portion in a case that the robot has a close-loop connection mechanism.

For example, a dynamic whole-body dynamics control target $$\operatorname*{argmin}_{(\tau, f, \lambda)} z$$

for the robot labeled in FIG. 3A may be represented by the following formula (23):

$$\operatorname*{argmin}_{(\tau, f, \lambda)} z = \left\| \ddot{q}^{des} - \ddot{q} \right\|^2_{W_q} + \left\| \tau^{des} - \tau \right\|^2_{W_\tau} + \left\| f \right\|^2_{W_f} + \left\| \lambda \right\|^2_{W_\lambda}, \quad (23)$$

where as described above, $\ddot{q}^{des}$ may include the desired accelerations $\dot{v}_b^{des} = [\dot{v}_{b,p}^{des}\ \dot{v}_{b,r}^{des}]$ of the base portion in the pitch and roll directions and the desired acceleration $\dot{v}_W^{des}$ of the driving wheel, and $\ddot{q}$ is a vector formed by a set of accelerations of each joint during movement. $\tau^{des}$ is a vector formed by a set of desired torques set for each joint. $\tau$ is a vector formed by a set of torques of each joint during actual movement. f is a generalized force provided by the ground at a point of contact in a case that the robot is in actual contact with the ground. $\lambda$ is a close-loop force exerted by a front leg portion on a rear leg portion during movement of the robot. The subscripts $W_q$, $W_\tau$, $W_f$, $W_\lambda$ respectively represent weight coefficient matrices that need to be multiplied by $\ddot{q}$, $\tau$, f, and $\lambda$ when calculating the norm of formula (23).

After the control target of the whole-body control for the robot is determined, at least one candidate control torque combination corresponding to each joint that satisfies various constraint conditions of the robot needs to be determined. A candidate control torque combination is then selected, from at least one candidate control torque combination, such that the dynamic whole-body dynamics objective function satisfies a predetermined condition, and each candidate control torque in the selected candidate control torque combination is used as the control torque for controlling each joint in the plurality of joints.

In some embodiments, the movement of the robot may be limited to various constraints, such as the maximum torque that each joint can provide and limitations of mechanical configurations. According to some embodiments, the constraint condition corresponding to motion of the robot includes at least one of the following: a dynamic constraint, a close-loop linkage constraint, a nonholonomic constraint, and a friction constraint.

According to some embodiments, the dynamic constraint may be determined at least partially based on a dynamic model of the robot, and the dynamic model may be configured for representing changing relationships between each joint and a center of mass angle, an angular velocity, an angular acceleration, a joint torque, an external contact force during movement of the robot.

In some embodiments, based on the generalized coordinates q of the robot as described above, a generalized velocity set $\dot{q} = [\dot{q}_{fb}^T, \dot{q}_j^T]^T$ and a generalized acceleration set $\ddot{q} = [\ddot{q}_{fb}^T, \ddot{q}_j^T]^T$ of the robot joints can be determined correspondingly. A person skilled in the art is to understand that, $\dot{q}_{fb}$ and $\ddot{q}_{fb}$ respectively represent an instantaneous angular velocity and an instantaneous angular acceleration of the robot body. Similarly, a joint torque may also be represented by $\tau = [\tau_1, \tau_2, \ldots, \tau_8]^T$.

Therefore, a general robot dynamic model can be constructed as shown in the following formula (24):

$$M(q)\ddot{q} + C(q, \dot{q}) = S^T \tau + J_f^T f + J_\lambda^T \lambda \qquad (24)$$

where $M(q) \in \mathbb{R}^{(6+n_j) \times (6+n_j)}$, and M(q) represents a mass matrix of the robot. $C(q, \dot{q}) \in \mathbb{R}^{(6+n_j)}$, where $C(q, \dot{q})$ represents a gravity term, a centrifugal force term, and a Coriolis force term of the robot. $S = [^0{}_{n_j \times 6}\ I_{n_j \times n_j}]$, where the matrix S is configured to select active joints from all joints. If an element in S is 0, it indicates that the element is an undriven joint. If it is not 0, it indicates that the element is an active joint. f is the generalized force provided by the ground at the point of contact when the robot is in contact with the ground. $J_f \in \mathbb{R}^{3n_c \times (n_j + 6)}$, where $J_f$ is a concatenated contact Jacobian matrix for f. $\lambda$ is the close-loop force exerted by the front leg portion on the rear leg portion. $J_\lambda \in \mathbb{R}^{3n_\lambda \times (n_j + 6)}$, where $J_\lambda$ is a concatenated contact Jacobian matrix for $\lambda$. $n_c$ is a number of points of contact between the driving wheel and the ground. Taking into account close-loop constraints (that is, on the real machine, each joint of the robot is to be fixedly connected), $n_\lambda$ is a number of points of contact between open-loop links. For the robot shown in FIG. 1A and FIG.

3A, $n_c=2$ and $n_\lambda=2$. For example, the wheel leg portion of the robot may be a five-bar linkage. The number of points of contact between the open-loop links of the close-loop constraint of the five-bar linkage (for example, between points $P_1$ and $P_2$ in FIG. 3A) is 2.

Therefore, for example, the dynamic model shown in the foregoing formula (23) can be used as an example of the dynamic constraint to limit the range of energy changes of the robot during movement. A person skilled in the art is to understand that the limitations of the dynamic model are not limited thereto. For example, to facilitate the analysis of energy changes of the robot, a simplified dynamic model can be established for the robot to simplify the corresponding dynamic model constraint of formula (23) in dynamic whole-body dynamics control.

For example, the following formula (25) shows an example of a close-loop linkage constraint for the robot in FIG. 3A according to some embodiments. A person skilled in the art is to understand that the close-loop linkage constraint may alternatively be shown in other manners and is not limited thereto.

$$J_\lambda \ddot{q} + \dot{j}_\lambda \dot{q} = 0 \tag{25}$$

$J$ and $J_{P_2}$ are Jacobian matrices corresponding to points $P_1$ and $P_2$ respectively. The subscripts $J_{\cdot,l}$ and $J_{\cdot,r}$ identify the left wheel leg portion and the right wheel leg portion respectively.

For example, assuming that the wheel is purely rolling and in contact with the ground, there is no slip and sliding in the radial and axial directions of the wheel. The following formula (26) shows an example of a nonholonomic constraint for the robot in FIG. 3A according to some embodiments. A person skilled in the art is to understand that the nonholonomic constraint may alternatively be shown in other manners and is not limited thereto.

$$_B J_W^{(1,3)} \ddot{q}_B + \dot{j}_W^{(1,3)} \dot{q} = 0 \tag{26}$$

$_B J_W^{(1,3)}$ is the x-axis and z-axis of the Jacobian matrix of the driving wheel-ground point of contact relative to the base portion.

In some embodiments, the setting of the friction constraint may be based on the assumption that a friction cone at the point of contact between the ground and the robot during actual movement is approximated as a pyramid-shaped friction cone (friction pyramid). In the local coordinate system of the contact force $f_i$ corresponding to each point of contact, a friction coefficient $\mu$ is given, and the friction force constraint may be represented as $|f_{i,x}| \le \mu f_{i,z}$ and $|f_{i,y}| \le \mu f_{i,z}$.

In addition to the four constraints shown above, a unilateral constraint may also be set correspondingly. An example of the unilateral constraint may be $f_{i,z} > 0$. This is not limited thereto.

Subject to the foregoing various constraints, control models for various control tasks can be determined correspondingly, and then the overall control for the robot based on various control tasks can be achieved under the whole-body control framework.

In operation S204, the corresponding joint is controlled based on the control torque for each joint.

The method provided in some embodiments can be combined with a whole-body dynamics control technology to provide a robot control method that implements a sphere balance task in the whole-body control framework. Balance control for a base portion of a wheel-legged robot and a sphere on the wheel-legged robot is added to a whole-body control framework of the wheel-legged robot, so that the sphere maintains balance during movement of the robot, thereby implementing the sphere balance task of the wheel-legged robot. An IDA-PBC algorithm is applied to a sphere balance non-prehensile operation on the wheel-legged robot, and to stabilize the entire robot system (including the robot and the sphere), the sphere balance control is designed in the whole-body control framework, thereby improving the robustness and flexibility of the wheel-legged robot.

The foregoing robot control method is experimentally tested in a variety of different scenarios, and is compared with experimental results of the robot control method in related technologies in some scenarios, as described below with reference to FIG. 6A to FIG. 9B. Considering that the asymptotic equilibrium can be chosen arbitrarily, $s_h^{(x)*}=0.0125$ m and $s_h^{(y)*}=0$ are used as target positions of the sphere in the following experiments. Further, as shown in FIG. 3B, considering that the sphere balance task in the y direction is less difficult than sphere balance in the x direction because an available moving distance is doubled, in the following experiments, sphere balance in the x direction is performed through IDA-PBC, while sphere balance in the y direction is performed through PID control.

The many different scenarios in the following experiments involve the following four example spheres. The physical parameters of these example spheres are shown in Table 1 below, where the mass $m_0$ and radius $\rho_0$ of these example spheres can be easily measured, and the moment of inertia $I_0$ is calculated using the mass and the radius directly dependent on whether the sphere is solid or hollow.

TABLE 1

|  | $m_0$ (kg) | $\rho_0$ (m) | $I_0$ (kg · m$^2$) |
|---|---|---|---|
| Iron ball | 0.502 | 0.028 | $1.574 \times 10^{-4}$ |
| Wooden ball | 0.658 | 0.060 | $9.475 \times 10^{-4}$ |
| Basketball | 0.608 | 0.123 | $6.132 \times 10^{-3}$ |
| Crystal ball | 2.214 | 0.06 | $3.168 \times 10^{-3}$ |

Below, the foregoing robot control method is tested through a sphere balance task for four types of spheres (the iron ball, the wooden ball, the basketball and the crystal ball) provided above as examples and not as limitations, and control performance is compared with PID control.

Figure 6A:
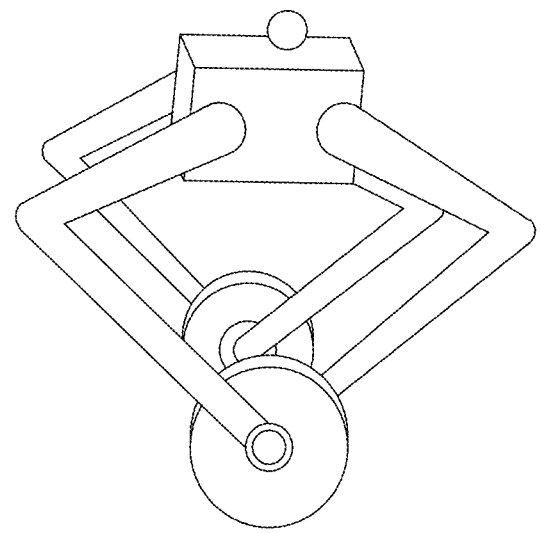
FIG. 6A is a schematic diagram of an experiment on balancing an iron ball according to some embodiments.
Figure 6A:
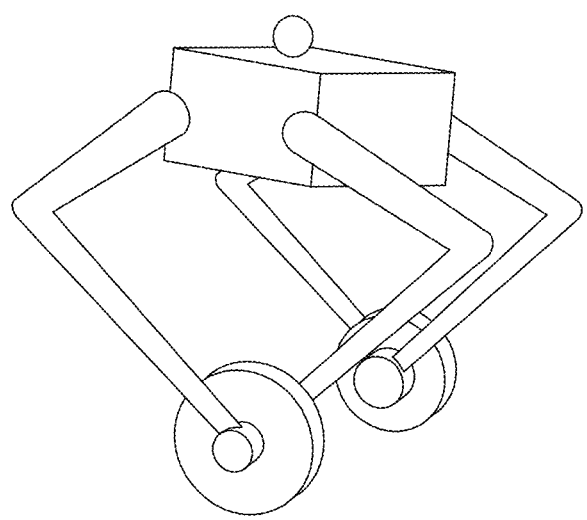
Figure 6B:
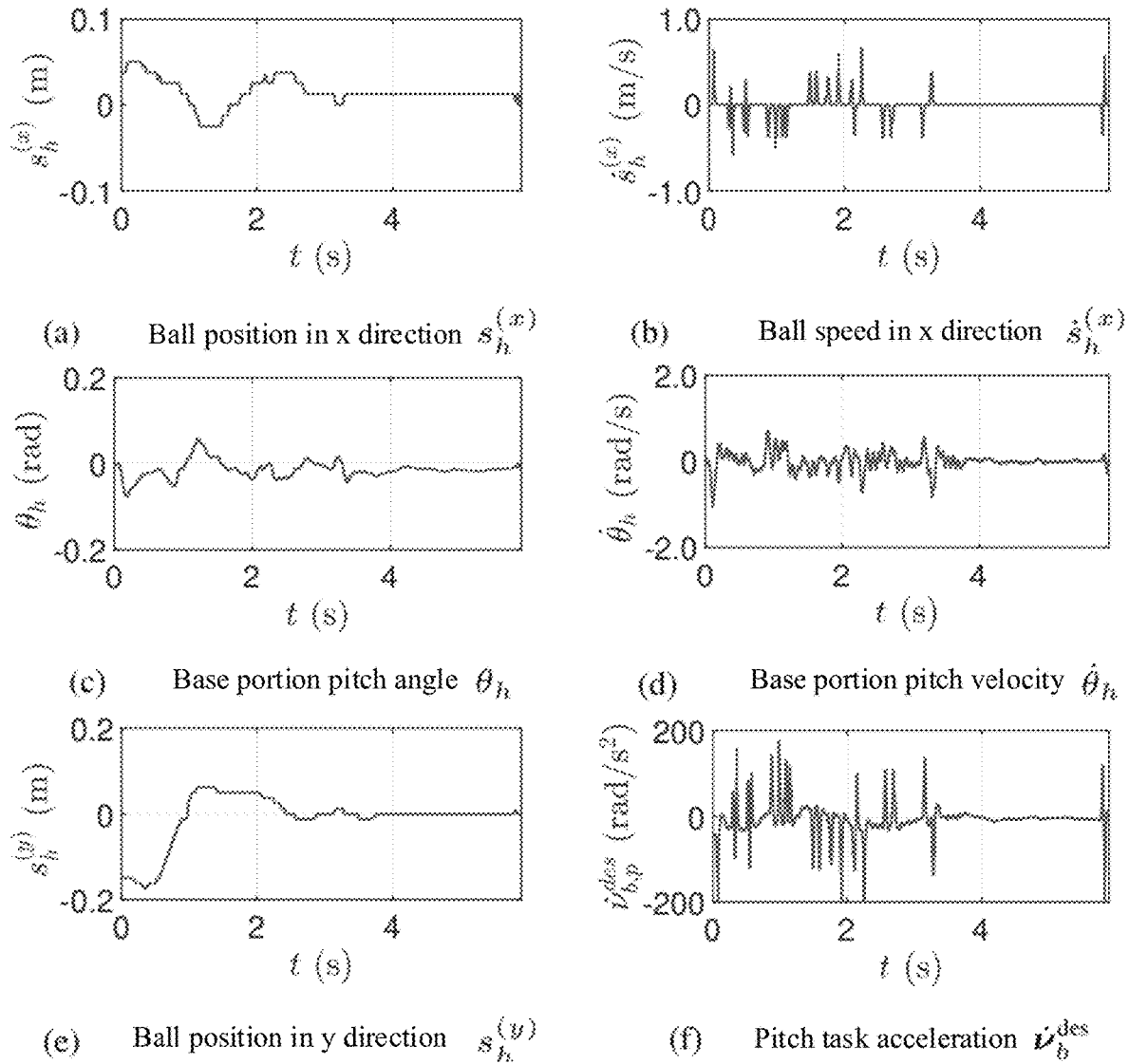
FIG. 6B is a data diagram of an experiment on balancing an iron ball through IDA-PBC according to some embodiments.
Figure 6C:
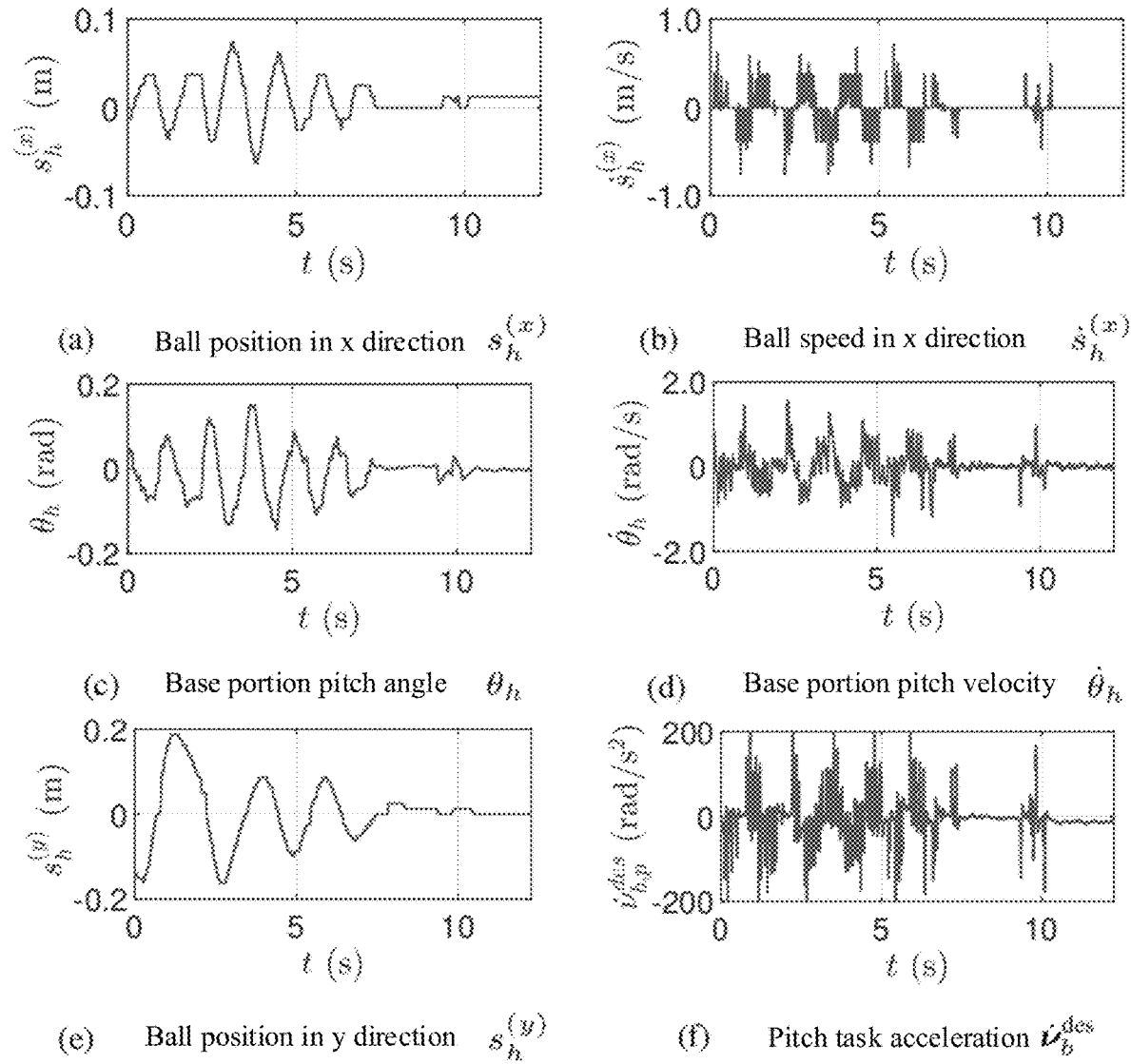
FIG. 6C is a data diagram of an experiment on balancing an iron ball through PID control according to some embodiments.

FIG. 6A to FIG. 6C correspond to the balance task of the iron ball. FIG. 6A is a schematic diagram of an experiment on balancing an iron ball according to some embodiments. FIG. 6B is a data diagram of an experiment on balancing an iron ball through IDA-PBC according to some embodiments. FIG. 6C is a data diagram of an experiment on balancing an iron ball through PID control according to some embodiments.

In some embodiments, for the balance control for the iron ball by using the robot control method, the IDA-PBC controller in the WBC framework can first be set based on the parameters of the iron ball shown in Table 1, so that the controller can perform corresponding balance control on the iron ball.

As shown in FIG. 6B, the iron ball is randomly placed at the lower left portion $s_h^{(x)} \approx 0.04$ m ((a) in FIG. 6B) and $s_h^{(y)} \approx -0.15$ m ((e) in FIG. 6B) of the upper surface of the base portion at the beginning of the experiment. By using the IDA-PBC method to perform balance control of the iron ball, the iron ball is controlled to the designed target positions $s_h^{(x)*}=0.0125$ m and $s_h^{(y)*}=0$ within 4 seconds, that is, the nonlinear system reaches asymptotic equilibrium. (c) and (d) in FIG. 6B respectively show the changes in the pitch angle of the base portion and the pitch velocity in the balance control process of the iron ball by using the IDA-PBC method, where the maximum value of the pitch angle of the base portion is about 0.07 rad (4°). This result means that the robot remains stable through the balance task in the whole-body control framework, and the sphere balance action is not violent (no large shaking is produced).

In addition, (f) in FIG. 6B shows a variation curve of the pitch task acceleration $\dot{v}_b^{des}$ outputted by the IDA-PBC controller. There are some oscillations in the changes in the pitch task acceleration. This is due to the natural limitations of a nonholonomic dynamic system. For the nonholonomic dynamic system, Brockett's necessary condition does not hold. Therefore, smooth feedback cannot be achieved. In subsequent experiments, the acceleration outputted by the controller oscillated to a greater or lesser extent, depending on the trade-off between response rates.

As shown in FIG. 6A, the PID controller is used to control the sphere balance of the same iron ball. Because the parameters of the PID controller are manually adjusted for the iron ball, the controller is also stable. As shown in FIG. 6C, the iron ball is controlled to the designed target position within 10 s ((a) and (c) in FIG. 6C). It means that when the sphere position control error is small, the PID controller is insensitive, which may affect the convergence speed near the balance point. Compared with IDA-PBC, the PID controller responds slower, but its control law ((f) in FIG. 6C) is more oscillatory, which results in oscillations in the velocity of the sphere ((b) in FIG. 6C) and the pitch angular velocity ((d) in FIG. 6C) of the base portion.

As described above, the faster response and smaller oscillation of the sphere balance by using the IDA-PBC method show that some embodiments use the IDA-PBC method to perform sphere balance control and has a better effect than the sphere balance control based on PID control.

Figure 7:
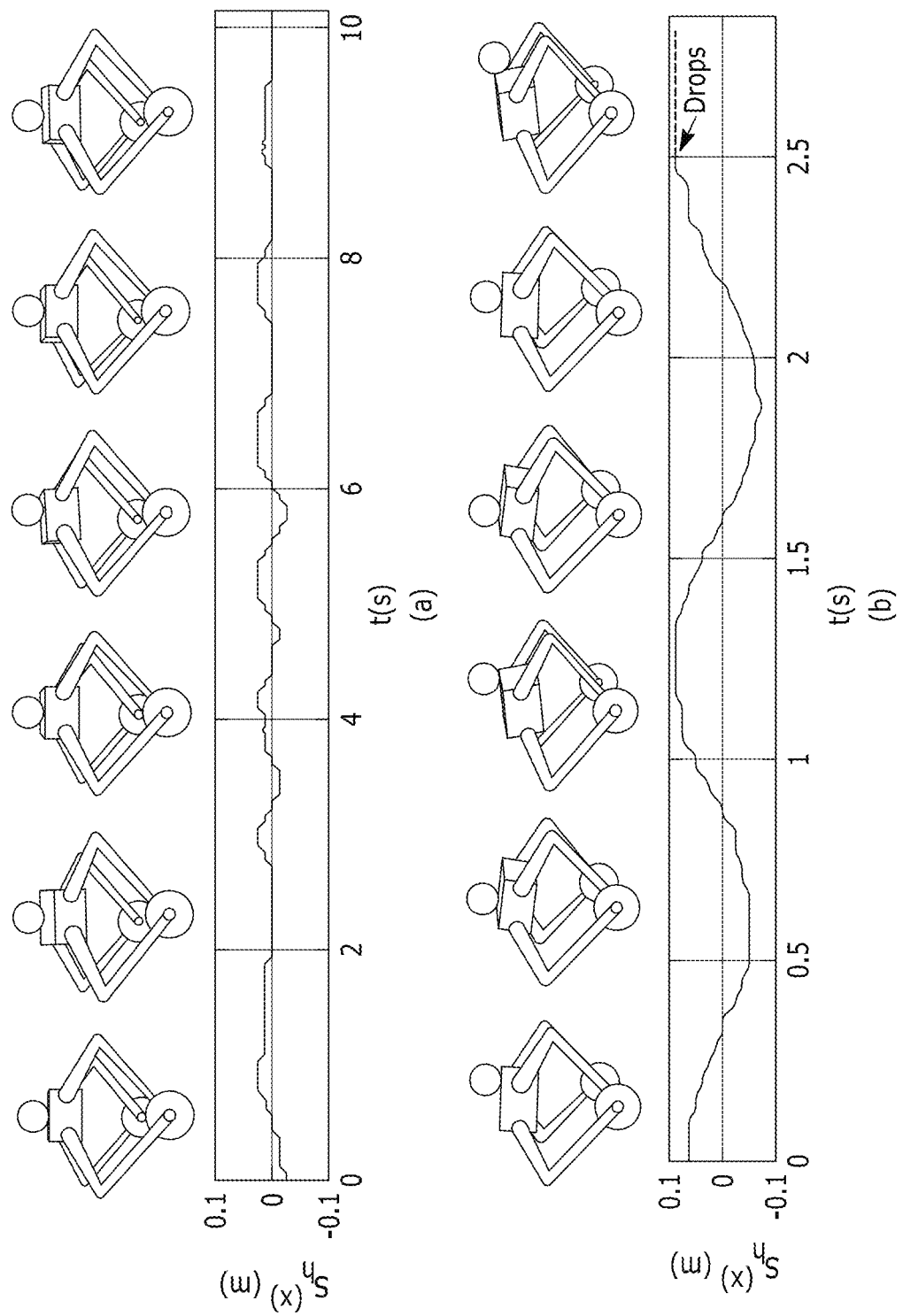
FIG. 7 is a schematic diagram and a data diagram of an experiment on balancing a wooden ball according to some embodiments.

FIG. 7 corresponds to the balance task of the wooden ball. FIG. 7 is a schematic diagram and a data diagram of an experiment on balancing a wooden ball according to some embodiments. As shown in FIG. 7, the process and results of balance control for the wooden ball based on IDA-PBC and PID control respectively are provided. By balancing the wooden ball in Table 1, a more direct comparison between the robot control method of some embodiments and related technical methods can be provided.

When using IDA-PBC based sphere balance control, the controller remains stable after updating the ball parameters. As shown in (a) in FIG. 7, when using the sphere balance control based on IDA-PBC, the wooden ball moves slightly near the balance point, and the displacement gradually decreases. As a comparison, when using sphere balance control based on PID control, and using the same PID gain as the foregoing iron ball experiment, as shown in (b) in FIG. 7, the wooden ball moves repeatedly on the plane of the base portion and falls at 2.5 s. Such experimental results mean that the sphere balance task is challenging for controller design and the robustness of PID control is unqualified. Therefore, if PID control is used for different spheres, the controller parameters need to be readjusted for each sphere, which requires the control foundation or engineering experience of the experimenter.

For the robot control method of some embodiments, by using nonlinear control IDA-PBC, the information of the sphere (such as the mass, the radius, and the moment of inertia) has been taken into account in the model of the sphere balance system in the derivation process. Therefore, after replacing different spheres, only the corresponding parameters of the sphere need to be updated to the controller to ensure the stability of the sphere balance system. Moreover, in the derivation process of IDA-PBC, the stability of the ideal close-loop system has been guaranteed during design. Therefore, the corresponding designed controller can certainly stabilize the sphere balance system. As a model-based controller, IDA-PBC can update the physical parameters of the sphere to ensure the stability of the robot system, which is obviously better than the re-adjustment of the PID controller.

Figure 8A:
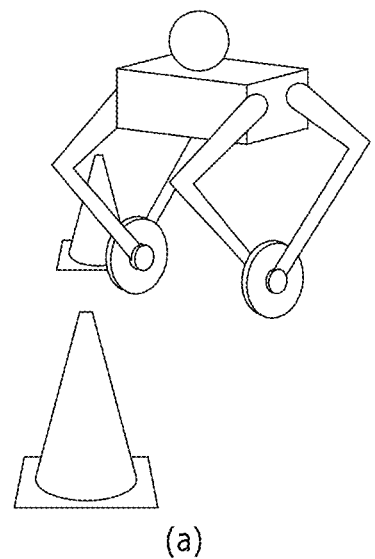
FIG. 8A is a schematic diagram of an experiment on balancing a wooden ball in two robot movement scenarios according to some embodiments.
Figure 8A:
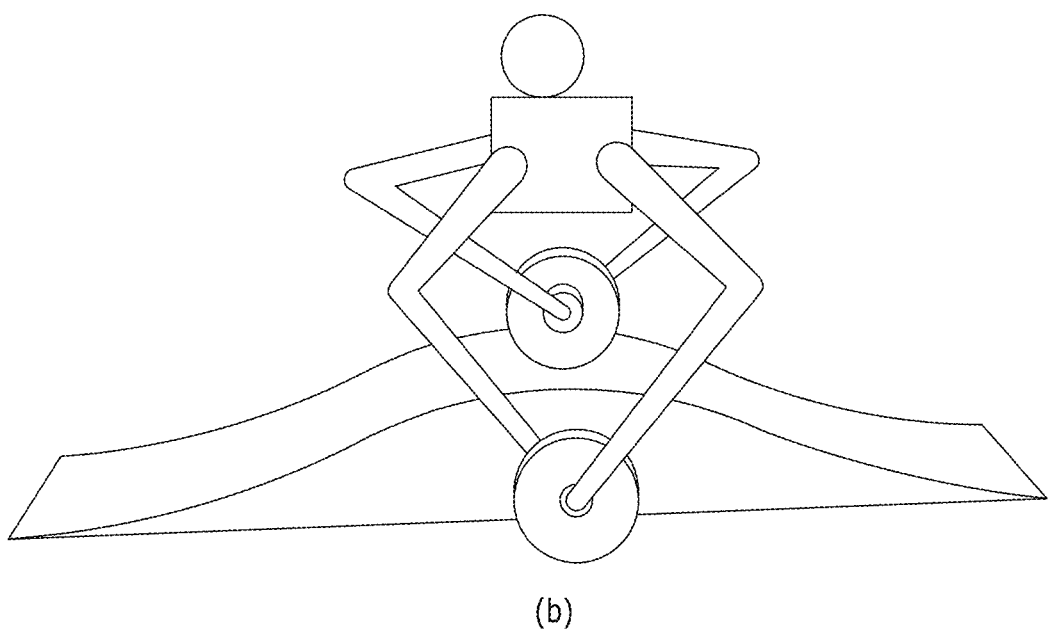
Figure 8B:
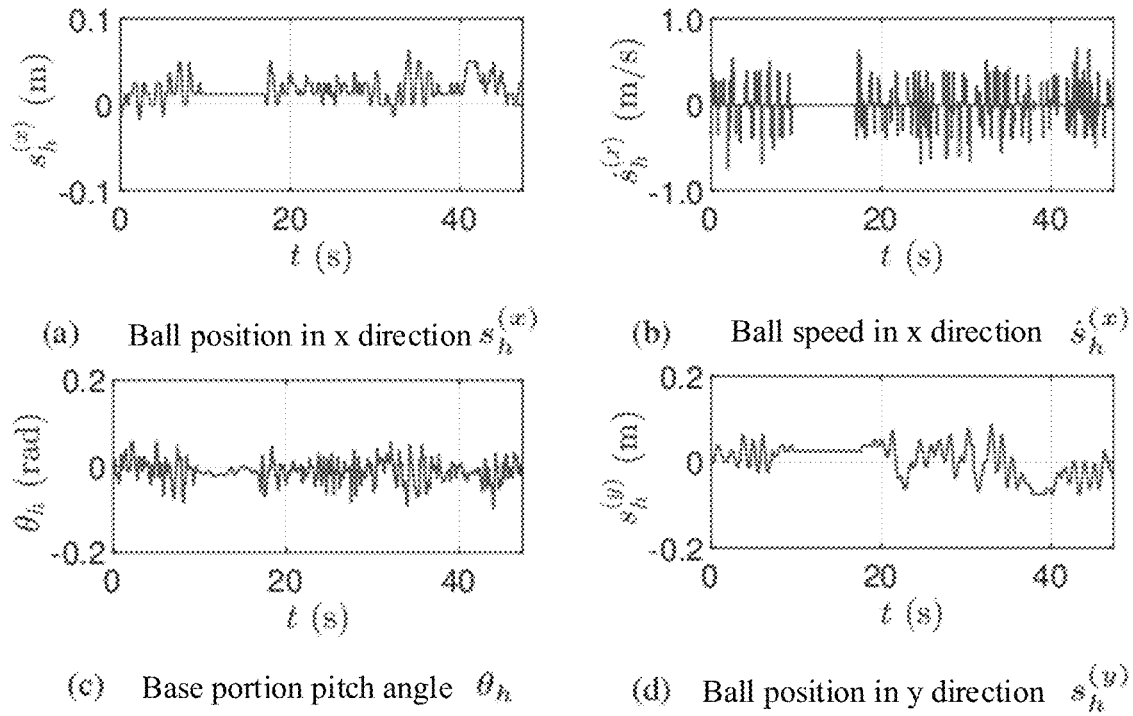
FIG. 8B is a data diagram of an experiment on balancing a wooden ball by a robot while moving around a pile according to some embodiments.
Figure 8C:
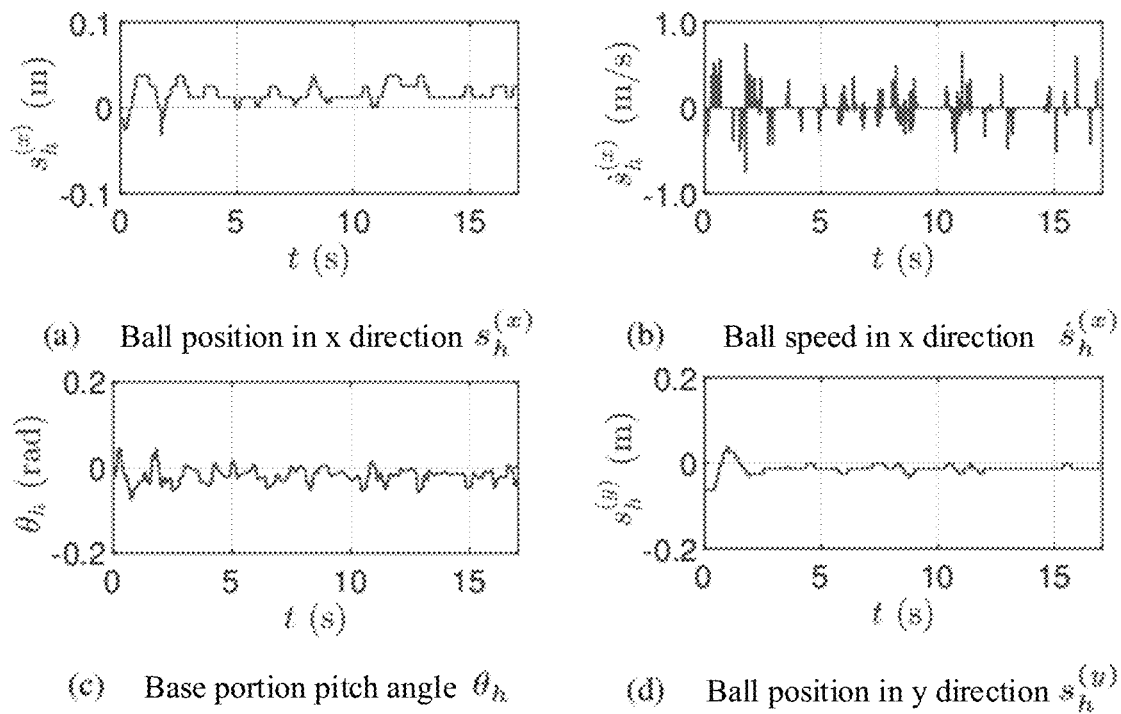
FIG. 8C is a data diagram of an experiment on balancing a wooden ball by a robot while moving on a curved surface according to some embodiments.

FIG. 8A to FIG. 8C correspond to the balance task of the wooden ball when the robot moves around a pile or moves on a curved surface. FIG. 8A is a schematic diagram of an experiment on balancing a wooden ball in two robot movement scenarios according to some embodiments. FIG. 8B is a data diagram of an experiment on balancing a wooden ball by a robot while moving around a pile according to some embodiments. FIG. 8C is a data diagram of an experiment on balancing a wooden ball by a robot while moving on a curved surface according to some embodiments.

Considering that the linear speed of the robot is not considered when deriving the IDA-PBC for the sphere balance task above, which is the main interference of the model-based controller, in this experiment, the robot is designed to move clockwise and counterclockwise around the pile, as shown in (a) in FIG. 8A, where the linear speeds of the robot in both the x and y directions are taken into account. As shown in the results in FIG. 8B, the sphere maintains balance around the designed target position $s_h^{(x)}$ *=0.0125 m ((a) in FIG. 8B), which indicates that IDA-PBC together with the WBC framework is highly robust. In addition, the position $s_h^{(y)}$ of the sphere in the y direction is slightly affected by the linear speed of the robot. When the robot rotates counterclockwise and clockwise respectively, the sphere moves to the right and left respectively ((d) in FIG. 8B). Generally, when the linear speed of the robot is less than a linear speed threshold, the sphere balance control based on IDA-PBC is robust to the linear speed of the robot.

In addition, after considering that the robot passes through flat terrain, the maneuverability of the robot on uneven terrain can also be tested, as shown in (b) in FIG. 8A. In this experiment, the right wheel leg portion of the robot stands on the top of a 0.2-meter-high curved surface while performing sphere balance control. By designing the sphere balance control in the whole-body control framework, based on the help of WBC, the right wheel leg portion of the robot can adapt to the height of the slope through the height task, and the robot can remain stationary on the top of the curved surface through the balance task and a yaw task. Finally, the sphere maintains balance on the base portion through the pitch task and the roll task. As shown in (a) and (d) in FIG. 8C, the position of the sphere deviates slightly from the designed target position. This position error can be reduced by adjusting parameters in the WBC, but in this challenging case it is acceptable.

Figure 9A:
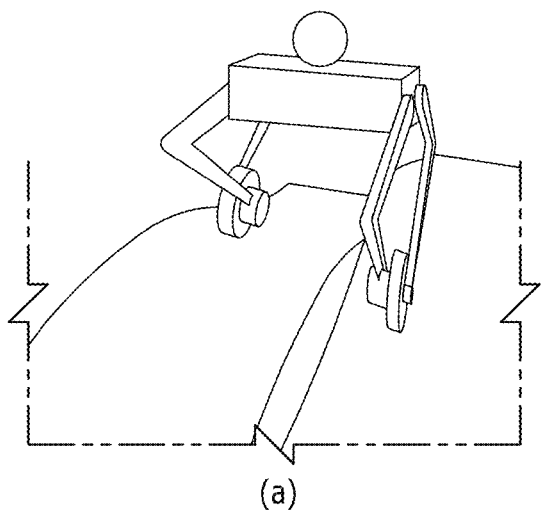
FIG. 9A is a schematic diagram of an experiment on balancing a crystal ball by a robot while passing through a misaligned curved surface according to some embodiments.
Figure 9A:
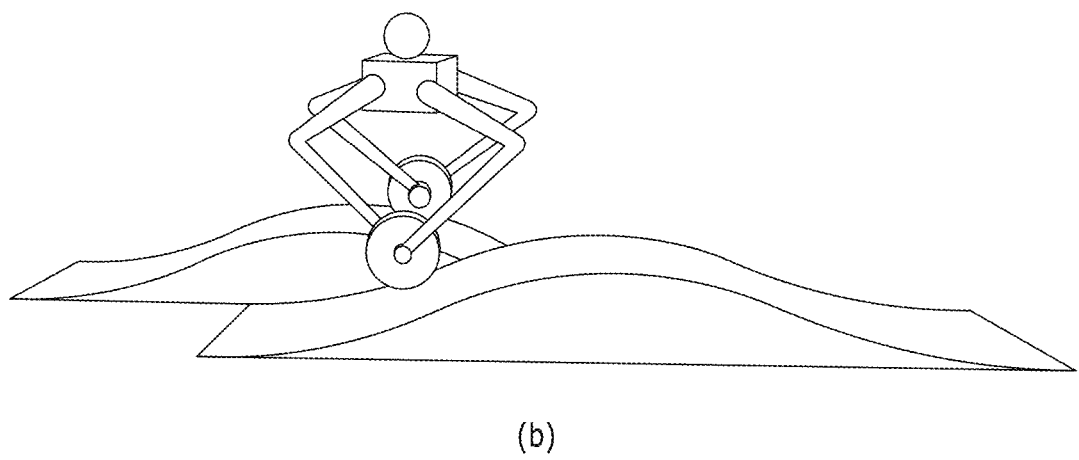
Figure 9B:
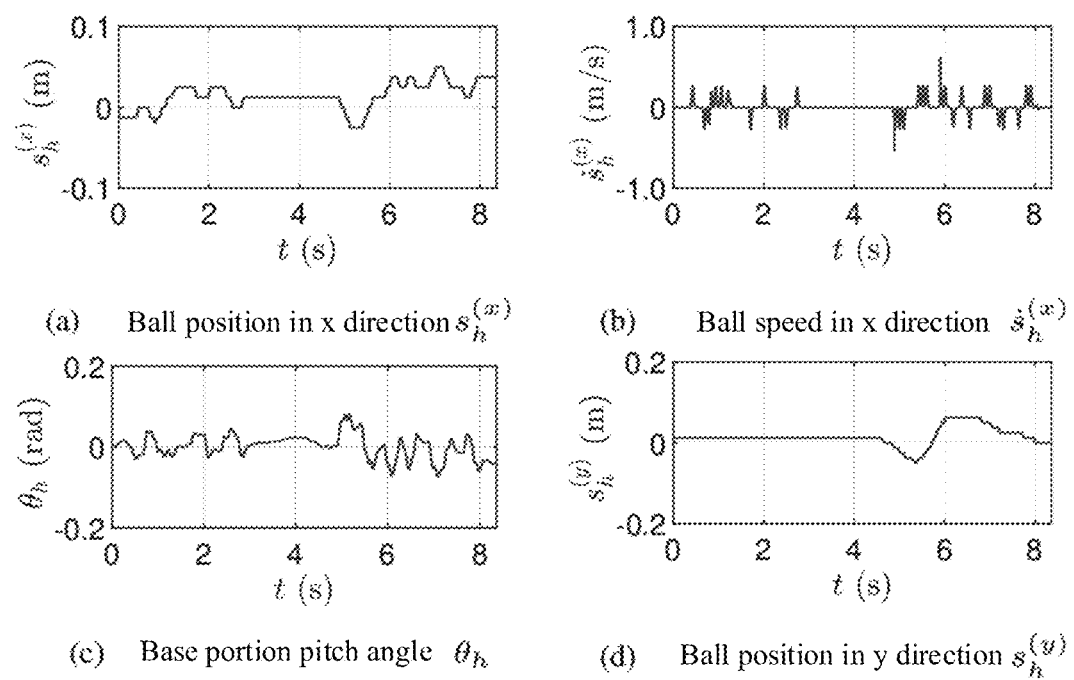
FIG. 9B is a data diagram of an experiment on balancing a crystal ball by a robot while passing through a misaligned curved surface according to some embodiments.

FIG. 9A and FIG. 9B correspond to the balance task of the crystal ball when the robot passes through a misaligned curved surface. FIG. 9A is a schematic diagram of an experiment on balancing a crystal ball by a robot while passing through a misaligned curved surface according to some embodiments. FIG. 9B is a data diagram of an experiment on balancing a crystal ball by a robot while passing through a misaligned curved surface according to some embodiments.

After testing the robustness to robot motion and terrain changes as described above with reference to FIG. 8A to FIG. 8C, in this experiment, the two abilities can be combined to pass two misaligned curved surfaces as shown in FIG. 9A. In this experiment, a 2.2 kg crystal ball is used to simulate a spherical object in daily life such as fruits, which are heavy and fragile. The results in FIG. 9B demonstrate the stability of WBC for robot balance and IDA-PBC for sphere balance. Similar to the previous experiment, the control of the position of the sphere in the x direction is satisfactory ((a) in FIG. 9B), while the control of the position of the sphere in the y direction is slightly defective because the sphere moves to the other side of the wheel leg portion that stands higher as the robot moves along the curved surface ((d) in FIG. 9B).

Therefore, through the experiments described above with reference to FIG. 6A to FIG. 9B and comparison of the results, the control system combining IDA-PBC and WBC has the following advantages:

First, as a nonlinear controller, IDA-PBC does not linearize the originally nonlinear sphere balance system, so that the control effect of IDA-PBC is better than the linear controller PID. The result is reflected in the foregoing iron ball balance task with reference to FIG. 6A to FIG. 6C, where IDA-PBC has faster convergence.

IDA-PBC is a model-based controller. When replacing the sphere, only the physical parameters of the new sphere (such as the mass and the radius) needs to be updated into the controller to obtain a stable controller, so that the sphere does not fall. When using the model-free PID controller, after the sphere is replaced, an artificial parameter adjustment process needs to be carried out to ensure the stability of the sphere balance. This result is reflected in the wooden ball balance task above with reference to FIG. 7, where IDA-PBC can maintain balance of the ball, while PID control cannot maintain balance of the ball.

Finally, to improve the robustness and dexterity of the sphere balance task and the overall robot, the WBC control framework is used for the wheel-legged robot. The wheel balancing task ensures that the robot can remain stable in two-wheeled mode. The base portion pitch task and the base portion roll task allow the base portion of the robot to rotate. Therefore, the robot can achieve the sphere balance task on the upper body while maintaining balance on both wheels.

As described above, the robot control method of some embodiments apply the IDA-PBC algorithm to the sphere balance non-prehensile operation on the wheel-legged robot, where the state of the sphere is updated by the touch sensor array, and the resolution is optimized based on the trade-off between accuracy and the update frequency. In addition, to stabilize the entire robot system (including the robot and the sphere), the sphere balance control is designed in the whole-body control framework. This also improves the robustness and flexibility of the robot. The stability of IDA-PBC is demonstrated through extensive experiments using different spheres. Although IDA-PBC is a model-based controller, it is easy to operate by simply updating physical parameters (such as the mass, the radius, and the moment of inertia) to adapt to different spheres. Furthermore, with the help of WBC, robustness and flexibility are demonstrated when performing sphere balance tasks on uneven terrain.

However, it is to be understood that to realize the sphere balance task of the robot in the dual-wheel balance mode, the main goal of the sphere balance task may include two parts: the first part is to maintain the dual-wheel balance, and the second part is to ensure that the base portion is rotatable. Therefore, to achieve the two goals, the whole-body control framework is used in some embodiments, in which all motors are torque controlled. However, a brushless direct current motor used by the robot can also control the position or speed. Therefore, the dual-wheel balance task can also be achieved through the speed control of the motor at the driving wheel. The desired pitch angle and roll angle of the base portion are used to calculate the desired angle of each motor at the base portion through inverse kinematics, and then the sphere balance task is implemented through the motor control. However, neither the speed control nor the position control of the motor has the flexibility of torque control, so that the overall sphere balance effect is not as good as the robot control method in some embodiments.

According to the robot control method provided in some embodiments, passivity based control for a nonlinear system formed by both a base portion of a wheel-legged robot and a sphere on the base portion is added to whole-body control for the wheel-legged robot, to determine base control information for maintaining balance of the sphere, and determine control for each joint of the robot based on the base control information. In this way, the wheel-legged robot can maintain balance of the sphere during movement, thereby implementing the sphere balance task of the wheel-legged robot. According to the robot control method provided in some embodiments, the wheel-legged robot can balance different rigid spheres on roads of various terrains, and can ensure stability of the sphere balance system after replacing a different sphere only by updating corresponding parameters of the sphere to the controller, without re-adjusting the controller.

In addition, the robot control method provided in some embodiments may be applied to sphere balance scenarios of other machines (including robots). Because the modeling and control of the sphere balance system in some embodiments is decoupled from other parts of the robot, the sphere balance control method of some embodiments can be applied to any system that performs sphere balance on a rotatable plane. Meanwhile, sphere balance on a two-wheeled wheel-legged robot needs to be combined with the robot balance control in the whole-body control in this specification. For robots with three or more legs, due to the existence of a steady state in contact with the ground, the sphere balance tasks all correspond to the simplified case of the sphere balance task of the two-wheeled wheel-legged robot.

Figure 10:
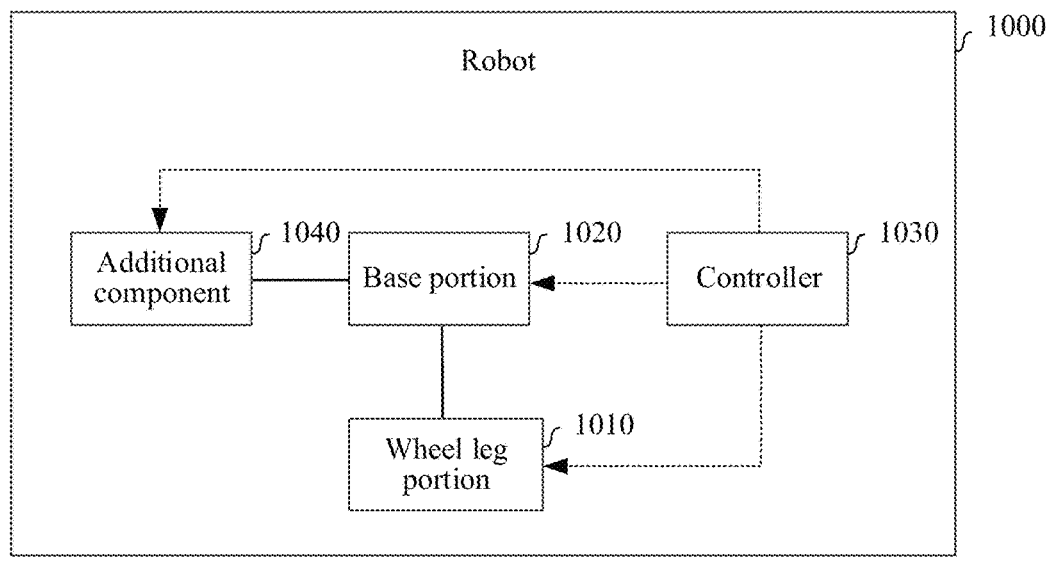
FIG. 10 is a schematic diagram of a robot according to some embodiments.

Some embodiments provide a robot. FIG. 10 is a schematic diagram of a robot 1000 according to some embodiments. The robot 1000 includes: a wheel leg portion 1010; and a base portion 1020, where the base portion 1020 is connected to the wheel leg portion 1010, and the wheel leg portion 1010 includes a plurality of joints.

The wheel leg portion refers to the wheeled component used by the robot to achieve movement, which includes, for example, a wheel portion and a leg portion connected to a central shaft of the wheel portion and used to implement motion control for the wheel portion. The specific composition type of the wheel leg portion and a number of wheel portions is not limited thereto.

The base portion refers to the main part of the robot, and may be, for example, the trunk part of the robot. The specific shape and composition of the base portion is not limited thereto. For example, the base portion is connected to the wheel leg portion through a bracket, or the base portion and the wheel leg portion may be connected in other manners. The specific connection manner between the base portion and the wheel leg portion is not limited thereto.

In some embodiments, the base portion includes, for example, two joints, and the wheel leg portion may include, for example, six joints. The embodiments are not limited to the specific number of joints included in the base portion and the wheel leg portion, and are not limited to the specific joint configuration of the robot.

In addition, in some embodiments, the robot further includes a controller 1030, where the controller 1030 is disposed on the robot and capable of performing the robot control method as described above, and has the functions as described above.

The controller includes, for example, a processing apparatus. The processing apparatus may include a microprocessor, a digital signal processor (DSP), an application specific integrated circuit (ASIC), a field programmable gate array, a state machine, or another processing device for processing electrical signals received from sensor wires. Such a processing device may include a programmable electronic device, such as a programmable logic controller (PLC), a programmable interrupt controller (PIC), a programmable logic device (PLD), a programmable read-only memory (PROM), or an electronic programmable read-only memory.

In some embodiments, the robot may further include: a driving motor disposed on the wheel leg portion and the base portion of the robot to control a plurality of joints of the wheel leg portion 1010 and the base portion 1020 based on the controller, to control the movement and posture adjustment of the wheel leg portion 1010 and the base portion 1020.

In addition, the robot may further include a bus, a memory, a sensor component, a communication module, an input/output apparatus, and the like. The bus may be a circuit that interconnects the components of the robot and transfers communication information (for example, control messages or data) among the components. The sensor component may be used to perceive the physical world, and include, for example, a camera, an infrared sensor, and an ultrasonic sensor. In addition, the sensor component may further include an apparatus for measuring the current operating and motion status of the robot, such as a Hall sensor, a laser position sensor, or a strain sensor. The communication module may, for example, be connected to a network in a wired or wireless manner to facilitate communication with the physical world (for example, a server). The communication module may be wireless and may include a wireless interface, such as IEEE 802.11, Bluetooth, a wireless local area network (WLAN) transceiver, or a radio interface for accessing a cellular telephone network (for example, for accessing CDMA, GSM, UMTS or transceivers/antennas for other mobile communication networks). In another example, the communication module may be wired and may include an interface such as Ethernet, USB, or IEEE 1394.

The input/output apparatus may transmit commands or data inputted, for example, from a user or any other external device to one or more other components of the robot, or may output commands or data received from one or more other components of the robot to a user or other external devices.

A plurality of robots may form a robot system to collaboratively complete a task, where the plurality of robots are communicatively connected to a server and receive collaborative robot instructions from the server.

Further, in some embodiments, the robot may further include an additional component 1040 disposed on the base portion. The additional component includes, for example, at least one joint. The additional component refers to a component connected to the base portion and whose motion process is independent of the base portion and the wheel leg portion. The additional component may, for example, have an own degree of freedom of movement, and the motion control process of the additional component is independent of the posture control of the base portion and balance movement control process of the wheel leg portion. In some embodiments, the additional component 1040 may be a controllable additional component (for example, a tail), where the tail may be used to balance the wheel-legged robot or assist in the movement of the wheel-legged robot. For example, the tail can help the wheel-legged robot maintain balance during movement. The specific setting position and the joint configuration of the additional component is not limited herein.

Some embodiments provide a non-transitory computer-readable storage medium, storing at least one computer executable instruction, where the computer executable instruction is loaded and executed by a processor to implement the foregoing robot control method.

Figure 11:
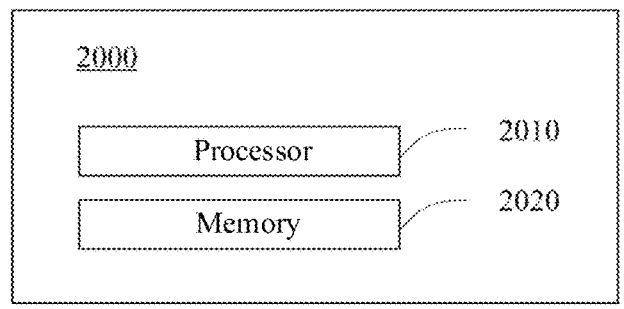
FIG. 11 is a schematic diagram of a robot control device according to some embodiments.

According to some embodiments, a robot control device is further provided, and the robot control device may include a controller in a robot. FIG. 11 is a schematic diagram of a robot control device 2000 according to some embodiments. As shown in FIG. 11, the robot control device 2000 may include one or more processors 2010 and one or more memories 2020. Computer executable instructions are stored in the memory 2020, and when run by one or more processors 2010, the computer executable instructions can perform the robot control method as described above.

The processor in some embodiments may be an integrated circuit chip with signal processing capabilities. The foregoing processor may be a general-purpose processor, a DSP, an ASIC, a field programmable gate array (FPGA) or another programmable logic device, a discrete gate or a transistor logic device, or a discrete hardware component. The processor can implement or execute methods, operations, and logical block diagrams disclosed in some embodiments. The general-purpose processor may be a microprocessor, or the processor may be any conventional processor or the like, and may be an X86 architecture or ARM architecture.

Various embodiments may be implemented in hardware or special purpose circuits, software, firmware, logic, or any combination thereof. Some aspects may be implemented in hardware, while other aspects may be implemented in firmware or software that may be executed by a controller, a microprocessor, or another computing device. When aspects of embodiments are illustrated or described as block diagrams, flowcharts, or using some other graphical representation, it may be understood that the blocks, apparatuses, systems, technologies, or methods described herein may serve as non-limiting examples implemented in hardware, software, firmware, special purpose circuits or logic, general purpose hardware or controllers, other computing devices, or some combinations thereof.

Figure 12:
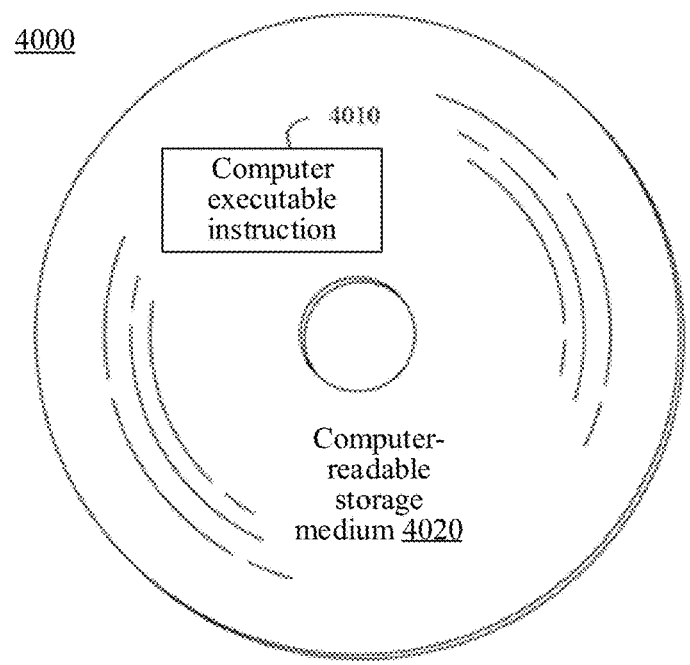
FIG. 12 is a schematic diagram of a storage medium according to some embodiments.

Some embodiments provide a computer-readable storage medium is further provided. FIG. 12 is a schematic diagram of a computer-readable storage medium 4000 according to some embodiments. As shown in FIG. 12, computer executable instructions 4010 are stored on the computer-readable storage medium 4020. When the computer executable instructions 4010 are executed by the processor, the robot control method of some embodiments described with reference to the foregoing drawings can be performed. The computer-readable storage medium in some embodiments may be a volatile memory or a non-volatile memory, or may include both a volatile and a non-volatile memory. The non-volatile memory may be a read-only memory (ROM), a PROM, an erasable programmable read-only memory (EPROM), an electrically erasable programmable read only memory (EEPROM), or a flash memory. The volatile memory may be a random access memory (RAM) used as an external cache. By way of illustration, but not limitation, many forms of RAMs are available, such as a static random-access memory (SRAM), a dynamic random access memory (DRAM), a synchronous dynamic random access memory (SDRAM), a double data rate synchronous dynamic random access memory (DDRSDRAM), an enhanced synchronous dynamic random access memory (Enhanced SDRAM, ESDRAM), a synchronous connects dynamic random access memory (Sync Link DRAM, SLDRAM), and a direct memory bus random access memory (DR RAM). The memory for the method described herein is intended to include, but is not limited to, these and any other suitable types of memories. The memory for the method described herein is intended to include, but is not limited to, these and any other suitable types of memories.

Some embodiments further provide a computer program product or a computer program. The computer program product or the computer program includes computer executable instructions, and the computer executable instructions are stored in a computer-readable storage medium. A processor, when reading the computer executable instructions from the computer-readable storage medium and executing the computer executable instructions, implements the robot control method according to some embodiments.

Some embodiments provide a robot control method, a robot, and a computer-readable storage medium.

According to the robot control method provided in some embodiments, passivity based control for a nonlinear system is added to whole-body control for a wheel-legged robot. The nonlinear system is formed by both a base portion of the wheel-legged robot and a sphere on the base portion. Based on this, base control information for maintaining balance of the sphere is determined, and control for each joint of the robot is determined based on the base control information. In this way, the wheel-legged robot can maintain balance of the sphere during motion, thereby implementing the sphere balance task of the wheel-legged robot. According to the robot control method provided in some embodiments, the wheel-legged robot can balance different rigid spheres on roads of various terrains, and can ensure stability of the sphere balance system after replacing a different sphere only by updating corresponding parameters of the sphere to the controller, without re-adjusting the controller.

Flowcharts and block diagrams in the drawings illustrate architectures, functions, and operations that may be implemented by using the system, the method, and the computer program product according to the various embodiments. In this regard, each block in the flowchart or the block diagram may represent a module, a program segment, or a part of a code. The module, the program segment, or the part of the code includes at least one executable instruction for implementing a specified logical function. In some embodiments, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each block in the block diagram and the flowchart, and a combination of blocks in the block diagram and the flowchart, may be implemented by using a specific hardware-based system that performs specified functions or operations, or may be implemented by using a combination of special-purpose hardware and computer instructions.

Various embodiments of may be implemented in hardware or special purpose circuits, software, firmware, logic, or any combination thereof. Some aspects may be implemented in hardware, while other aspects may be implemented in firmware or software that may be executed by a controller, a microprocessor, or another computing device. When aspects of some embodiments are illustrated or described as block diagrams, flowcharts, or using some other graphical representation, it may be understood that the blocks, apparatuses, systems, technologies, or methods described herein may serve as non-limiting examples implemented in hardware, software, firmware, special purpose circuits or logic, general purpose hardware or controllers, other computing devices, or some combinations thereof.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A control method, executed by a control device, for controlling a robot comprising a wheel leg portion and a base portion, the wheel leg portion and the base portion comprising a plurality of joints, and the wheel leg portion comprising at least two legs connected to at least one driving wheel, the control method comprising:
    obtaining motion information of the robot and motion information of a sphere placed on the base portion of the robot;
    determining, based on the motion information of the robot and the motion information of the sphere when passivity based control is performed on a system formed by the sphere and the base portion, base control information for controlling the base portion and balancing the sphere on the base portion;
    determining, based on the base control information, a control torque for controlling each joint of the plurality of joints; and
    controlling each joint based on the corresponding control torque while balancing the sphere on the base portion.

2. The control method according to claim 1, wherein determining the base control information for controlling the base portion comprises:
    determining, through interconnection and damping assignment-passivity based control and based on the motion information of the robot and the motion information of the sphere, the control torque for controlling the base portion; and
    determining, based on the control torque for controlling the base portion, the base control information for controlling the base portion, the base control information comprising control information for controlling an acceleration of the base portion in a pitch direction and control information for controlling an acceleration of the base portion in a roll direction.

3. The control method according to claim 2, wherein determining the control torque for controlling the base portion comprises:
    obtaining a current combined energy of the sphere and the base portion through the interconnection and damping assignment-passivity based control, wherein the current combined energy comprises a current combined kinetic energy of the sphere and the base portion and a current combined potential energy of the sphere and the base portion;

establishing a current combined system based on the current combined energy of the sphere and the base portion;

determining a desired combined system of the sphere and the base portion, the desired combined system having a desired combined energy, wherein the desired combined energy comprises a desired combined kinetic energy of the sphere and the base portion and a desired combined potential energy of the sphere and the base portion, the desired combined kinetic energy being determined such that the sphere is always located on the base portion and the desired combined potential energy being determined such that the desired combined potential energy has a minimum value based on the sphere reaching a target state on the base portion; and determining, based on the current combined energy and the desired combined energy, the control torque for controlling the base portion, wherein the current combined system is converted into the desired combined system by the control torque for controlling the base portion.

4. The control method according to claim 3, wherein the current combined system is represented as a combined system in a port-Hamiltonian form; and wherein determining, based on the control torque for controlling the base portion, the base control information for controlling the base portion comprises:

converting, according to the current combined system in the port-Hamiltonian form, the control torque for controlling the base portion into a desired acceleration of the base portion in the pitch direction and a desired acceleration of the base portion in the roll direction, the desired acceleration of the base portion in the pitch direction and the desired acceleration of the base portion in the roll direction constituting the base control information for controlling the base portion.

5. The control method according to claim 1, wherein determining, based on the base control information, the control torque for controlling each joint of the plurality of joints comprises:

determining, based on the motion information of the robot, overall control information for controlling the plurality of joints, the overall control information being configured for controlling the robot to maintain balance;

obtaining a constraint condition corresponding to motion of the robot; and determining, based on the constraint condition corresponding to motion of the robot, the overall control information, and the base control information, the control torque for controlling each joint of the plurality of joints.

6. The control method according to claim 5, wherein determining the control torque for controlling each joint of the plurality of joints comprises:

calculating, based on the overall control information and the base control information, at least one candidate control torque combination corresponding to each joint that satisfies the constraint condition;

determining a value corresponding to a dynamic whole-body dynamics objective function of the robot based on the at least one candidate control torque combination corresponding to each joint; and selecting, from the at least one candidate control torque combination corresponding to each joint, a target candidate control torque combination such that the dynamic whole-body dynamics objective function satisfies a predetermined condition, and determining each candidate control torque in the target candidate control torque combination as the control torque for controlling each joint of the plurality of joints.

7. The control method according to claim 6, wherein the wheel leg portion comprises at least two driving wheels; and wherein parameters of the dynamic whole-body dynamics objective function comprise at least one of:

a vector formed by a set of desired accelerations of the base portion in a pitch direction and in a roll direction;

a vector formed by a set of desired accelerations of each driving wheel during movement of the at least two driving wheels;

a vector formed by a set of desired torques set for each joint;

a generalized force provided by a ground surface at a point of contact when the robot is in contact with the ground surface; and a closed-loop force in the wheel leg portion when the robot has a closed-loop connection mechanism.

8. The control method according to claim 5, wherein the constraint condition corresponding to motion of the robot comprises at least one: a dynamic constraint, a closed-loop linkage constraint, a nonholonomic constraint, and a friction constraint.

9. The control method according to claim 8, wherein the dynamic constraint is determined at least partially based on a dynamic model of the robot, and the dynamic model is configured for representing changing relationships between each joint and a center of mass angle, an angular velocity, an angular acceleration, a joint torque, and an external contact force during movement of the robot.

10. The control method according to claim 1, wherein a touch sensor array is provided on a surface of the base portion, and the touch sensor array is configured to obtain the motion information of the sphere, wherein a resolution of the touch sensor array is determined by jointly pre-optimizing target information, and the target information comprises an accuracy of speed estimation of the touch sensor array and an update frequency of the motion information of the sphere.

11. A robot, comprising:

a wheel leg portion comprising at least two legs connected to at least one driving wheel;

a base portion, connected to the wheel leg portion, the wheel leg portion and the base portion comprising a plurality of joints; and a controller disposed on the robot, wherein the controller is configured to:

obtain motion information of the robot and motion information of a sphere placed on the base portion of the robot;

determine, based on the motion information of the robot and the motion information of the sphere when passivity based control is performed on a system formed by the sphere and the base portion, base control information for controlling the base portion and balancing the sphere on the base portion;

determine, based on the base control information, a control torque for controlling each joint of the plurality of joints; and control each joint based on the corresponding control torque while balancing the sphere on the base portion.

12. The robot according to claim 11, further comprising:

at least one driving motor, disposed on each of the wheel leg portion and the base portion of the robot, and configured to control the plurality of joints of the wheel leg portion and the base portion.

13. A non-volatile computer-readable storage medium, storing computer code which, when executed by at least one processor, causes the at least one processor to at least:
obtain motion information of a robot comprising a base portion and a wheel leg portion and obtain motion information of a sphere placed on the base portion of the robot, the wheel leg portion comprising at least two legs connected to at least one driving wheel;
determine, based on the motion information of the robot and the motion information of the sphere when passivity based control is performed on a system formed by the sphere and the base portion, base control information for controlling the base portion and balancing the sphere on the base portion;
determine, based on the base control information, a control torque for controlling each joint of a plurality of joints of the base portion and the wheel leg portion; and
control each joint based on the corresponding control torque while balancing the sphere on the base portion.

14. The non-volatile computer-readable storage medium according to claim 13, wherein determining the base control information for controlling the base portion comprises:
determining, through interconnection and damping assignment-passivity based control and based on the motion information of the robot and the motion information of the sphere, the control torque for controlling the base portion; and
determining, based on the control torque for controlling the base portion, the base control information for controlling the base portion, the base control information comprising control information for controlling an acceleration of the base portion in a pitch direction and control information for controlling an acceleration of the base portion in a roll direction.

15. The non-volatile computer-readable storage medium according to claim 14, wherein determining, through interconnection and damping assignment-passivity based control and based on the motion information of the robot and the motion information of the sphere, the control torque for controlling the base portion comprises:
obtaining a current combined energy of the sphere and the base portion through the interconnection and damping assignment-passivity based control, wherein the current combined energy comprises a current combined kinetic energy of the sphere and the base portion and a current combined potential energy of the sphere and the base portion;
establishing a current combined system based on the current combined energy of the sphere and the base portion;
determining a desired combined system of the sphere and the base portion, the desired combined system having a desired combined energy, wherein the desired combined energy comprises a desired combined kinetic energy of the sphere and the base portion and a desired combined potential energy of the sphere and the base portion, the desired combined kinetic energy being determined such that the sphere is always located on the base portion and the desired combined potential energy being determined such that the desired combined potential energy has a minimum value based on the sphere reaching a target state on the base portion; and
determining, based on the current combined energy and the desired combined energy, the control torque for controlling the base portion, wherein the current combined system is converted into the desired combined system by the control torque for controlling the base portion.

16. The non-volatile computer-readable storage medium according to claim 15, wherein the current combined system is represented as a combined system in a port-Hamiltonian form; and
wherein determining, based on the control torque for controlling the base portion, the base control information for controlling the base portion comprises:
converting, according to the current combined system in the port-Hamiltonian form, the control torque for controlling the base portion into a desired acceleration of the base portion in the pitch direction and a desired acceleration of the base portion in the roll direction, the desired acceleration of the base portion in the pitch direction and the desired acceleration of the base portion in the roll direction constituting the base control information for controlling the base portion.

17. The non-volatile computer-readable storage medium according to claim 13, wherein determining, based on the base control information, the control torque for controlling each joint of the plurality of joints comprises:
determining, based on the motion information of the robot, overall control information for controlling the plurality of joints, the overall control information being configured for controlling the robot to maintain balance;
obtaining a constraint condition corresponding to motion of the robot; and
determining, based on the constraint condition corresponding to motion of the robot, the overall control information, and the base control information, the control torque for controlling each joint of the plurality of joints.

18. The non-volatile computer-readable storage medium according to claim 17, wherein determining, based on the constraint condition corresponding to motion of the robot, the overall control information, and the base control information, the control torque for controlling each joint of the plurality of joints comprises:
calculating, based on the overall control information and the base control information, at least one candidate control torque combination corresponding to each joint that satisfies the constraint condition;
determining a value corresponding to a dynamic whole-body dynamics objective function of the robot based on the at least one candidate control torque combination corresponding to each joint; and
selecting, from the at least one candidate control torque combination corresponding to each joint, a target candidate control torque combination such that the dynamic whole-body dynamics objective function satisfies a predetermined condition, and determining each candidate control torque in the target candidate control torque combination as the control torque for controlling each joint of the plurality of joints.

19. The non-volatile computer-readable storage medium according to claim 18, wherein the wheel leg portion comprises at least two driving wheels; and
wherein parameters of the dynamic while-body dynamics objective function comprise at least one of:
a vector formed by a set of desired accelerations of the base portion in a pitch direction and in a roll direction;

a vector formed by a set of desired accelerations of each driving wheel during movement of the at least two driving wheels;

a vector formed by a set of desired torques set for each joint;

a generalized force provided by a ground surface at a point of contact when the robot is in contact with the ground surface; and a closed-loop force in the wheel leg portion when the robot has a closed-loop connection mechanism.

20. The non-volatile computer-readable storage medium according to claim 17, wherein the constraint condition corresponding to motion of the robot comprises at least one of: a dynamic constraint, a closed-loop linkage constraint, a nonholonomic constraint, and a friction constraint.

* * * * *